United States Patent [19]

Nakamura et al.

[11] 4,105,608
[45] Aug. 8, 1978

[54] HIGH IMPACT COMPOSITION OF RING-OPENING POLYMERIZATION PRODUCT

[75] Inventors: Junichi Nakamura, Yokohama; Hiroshi Konuma, Kawasaki; Shiro Kokuryo; Takashi Ueshima, both of Yokohama; Chutatsu Tsuge, Tokyo, all of Japan

[73] Assignee: Showa Denko K.K., Tokyo, Japan

[21] Appl. No.: 574,932

[22] Filed: May 6, 1975

[30] Foreign Application Priority Data

May 8, 1974 [JP] Japan .................................. 49-50219

[51] Int. Cl.² ............................................. C08L 91/00
[52] U.S. Cl. ............................. 260/23 R; 260/23 AR; 260/23 H; 260/23 XA; 260/23 S; 260/23.5 A; 260/23.7 R; 260/23.7 N
[58] Field of Search ................ 260/23 R, 23 AR, 617, 260/837, 31.2, 30.8, 93.1, 23 XA, 23 H, 23 S, 23.5 A, 23.7 R, 23.7 N, 23 R; 252/388

[56] References Cited

U.S. PATENT DOCUMENTS

| | | | |
|---|---|---|---|
| 2,721,189 | 10/1955 | Anderson | 260/93.1 |
| 2,831,037 | 4/1958 | Schmeling | 260/93.1 |
| 2,932,630 | 4/1960 | Robinson | 260/93.1 |
| 3,330,815 | 7/1967 | McKeon | 260/93.1 |
| 4,021,510 | 5/1977 | Ueshima | 526/281 |

*Primary Examiner*—Melvyn I. Marquis
*Assistant Examiner*—William Parker
*Attorney, Agent, or Firm*—Carroll F. Palmer

[57] ABSTRACT

High impact composition of ring-opening polymerization product formed of (A) 100 parts by weight of at least one ring-opening polymerization product selected from the group consisting of (a) ring-opening polymerization homopolymers of norbornene derivatives containing at least one nitrile group or a substituent including said nitrile group, (b) ring-opening polymerization homopolymers of norbornene derivatives containing at least one ester group or a substituent including said ester group, (c) ring-opening polymerization copolymers of combination of said norbornene derivatives, and (d) other ring-opening polymerization copolymers of any of said norbornene derivatives and 50 mol% at most of other unsaturated cyclic compounds; and (B) 0.05 to 10.0 parts by weight of specified metal salts of fatty acids.

7 Claims, No Drawings

HIGH IMPACT COMPOSITION OF RING-OPENING POLYMERIZATION PRODUCT

This invention relates to composition of ring-opening polymerization product, and more particularly to the type of high impact strength.

A product prepared by the ring-opening polymerization of 5-cyano-bicyclo[2,2,1]-heptene-2 using a catalyst consisting of compounds of tungsten and/or molybdenum and organic aluminium compounds or both types of compounds and a third component not only has a greater impact strength than polyvinyl chloride resin (PVC) and polypropylene resin (PP), and such tensile strength and hardness as are well comparable with those of PVC and higher than those of PP, but also generally displays high heat resistance (namely, has a high glass transition temperature). Therefore, this ring-opening polymerization product is available for high temperature application (refer to the Japanese Patent Application No. 31755/72).

Some of the present inventors found that novel polymers could be obtained by ring-opening polymerization of norbornene derivatives containing at least one ester group or a substituent including said ester group in the presence of a catalytic system consisting of compounds of tungsten and/or molybdenum, and organic aluminium compounds or said compounds mixed with at least one compound selected from the group consisting of water, peroxides, epoxides, organic halides, acetal compounds and alcoholic compounds including phenolic compounds, and previously filed a Japanese Patent Application No. 119785/72 based on said finding.

Further, a group of the present inventors previously found that it was possible to provide a novel type of polymer by the ring-opening polymerization of a norbornene derivative which was a different type from 5-cyano-bicyclo[2,2,1]-heptene-2 and contained at least one nitrile group or a substituent including said nitrile group, in the presence of the catalytic system disclosed in the above-mentioned Japanese Patent Application No. 31755/72 (refer to the Japanese Patent Application No. 108902/72).

The first mentioned product prepared by the ring-opening polymerization of 5-cyano-bicyclo[2,2,1]-heptene-2, and the similar products later proposed by said group of the inventors not only have more excellent mechanical properties such as impact strength and impact strength at low temperature and higher transparency than polyvinyl chloride resin and polypropylene resin manufactured on an industrial scale and now widely accepted, but also display good moldability and in consequence can be made into various forms, for example, containers and films by the molding processes widely accepted in the field of synthetic resins, such as injection molding, extrusion molding and press molding.

Where, however, the above-mentioned ring-opening polymerization products are molded into, for example, containers, daily necessaries, sundry goods, mechanical parts, parts of electrical appliances, etc., said products have hitherto been found to have still unsatisfactory impact strength.

It is generally known that an attempt to improve the impact strength of synthetic resin is made by blending rubber-like material therewith. However, the resultant composition has also been shown to indicate low workability, hardness and tensile strength.

It is accordingly the object of the invention to provide compositions free from the above-mentioned drawbacks encountered in the past and possessed of prominent impact strength and workability. This object is attained by providing compositions comprising (A) 100 parts by weight of at least one ring-opening polymerization product selected from the group consisting of (a) ring-opening polymerization homopolymers of norbornene derivatives containing at least one nitrile group or substituent including a nitrile group (hereinafter referred to as "cyano-substituted norbornene derivatives"), (b) ring-opening polymerization homopolymers of norbornene derivatives containing at least one ester group or substituent including an ester group (hereinafter referred to as "ester type norbornene derivatives"), (c) ring-opening polymerization copolymers of combination of said norbornene derivatives, and (d) other ring-opening polymerization copolymers of any of said norbornene derivatives and 50 mol% at most of unsaturated cyclic compounds; and (B) 0.05 to 10 parts by weight of a fatty acid salt of at least one metal selected from the group consisting of lithium, sodium, potassium, beryllium, magnesium, calcium, strontium, barium, copper, zinc, cadmium, aluminium, tin, lead, iron, nickel, and cobalt.

The above-mentioned component (A) of the subject compositions may consist of ring-opening polymerization products blended with resinous and/or rubber-like materials in place of said ring-opening polymerization products alone.

The compositions of this invention having high impact strength and workability as previously described are very useful due to applicability in various fields.

It is generally known that synthetic resins blended with metal salts of fatty acids indeed provide polymers of improved workability, but are little elevated in impact strength.

In contrast, compositions prepared according to this invention by adding special metal salts of fatty acids to the above-mentioned ring-opening polymerization products or said products blended with resinous and/or rubber-like materials are proved to have prominent impact strength as well as excellent workability.

The ring-opening polymerization product used in this invention is selected from the group consisting of (a) a ring-opening polymerization homopolymer of cyano-substituted norbornene derivatives, (b) a ring-opening polymerization homopolymer of ester type norbornene derivatives, (c) a ring-opening polymerization copolymer of combination of the above-listed norbornene derivatives and (d) a ring-opening polymerization copolymer obtained by said various types of norbornene derivatives and 50 mol% at most of other unsaturated cyclic compound. Obviously, these raw ring-opening polymerization products may be used alone or in combination.

The cyano-substituted norbornene derivatives used as a monomer in preparing the above-mentioned ring-opening polymerization product contain at least one nitrile group or a substituent including said nitrile group at the positions of 5 and 6 of bicyclo[2,2,1]-heptene-2 as shown in the following general formula:

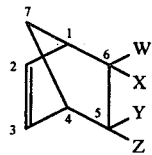

where W, X, Y, Z = the same or different ones selected from the group consisting of hydrogen atom, nitrile group, hydrocarbon radicals selected from alkyl radical having 1 to 20 carbon atoms, alkenyl radical having 2 to 20 carbon atoms, cycloalkyl radical having 4 to 20 carbon atoms, alkyl substituted cycloalkyl radical having 5 to 20 carbon atoms, aryl radical having 6 to 20 carbon atoms and aralkyl radical having 7 to 20 carbon atoms, and said hydrocarbon radicals substituted by the nitrile group, at least one of said W, X, Y and Z being a nitrile group or said hydrocarbon radicals substituted by the nitrile group.

The hydrocarbon radicals substituted by the nitrile group include a cyanomethyl radical, cyanoethyl radical, cyanopropyl radical, cyano-n-butyl radical, cyanoisobutyl radical and ω-cyano-n-heptyl radical. The hydrocarbon radicals include a methyl radical, ethyl radical, propyl radical, n-butyl radical, isobutyl radical, octyl radical, phenyl radical, cyaclohexyl radical and 2-octenyl radical.

The above-mentioned cyano-substituted norbornene derivatives can be synthesized by the Diels-Alder reaction between cyclopentadiene and vinyl compounds containing a nitrile group or substituent including said nitrile group, for example, acrylonitrile, methacrylonitrile, vinylidene cyanide, and maleonitrile (refer to "Organic Reactions" by H. L. Holmes, Vol. 4, pp. 60 to 173, 1948, published by John Wiley and Sons, Inc.). Formation of said cyano-substituted norbornene derivatives is also attained by reacting dicyclopentadiene with the above-mentioned vinyl compounds. Typical among the cyano-substituted norbornene derivatives are 5-cyano-bicyclo[2,2,1]-heptene-2, 5-methyl-5-cyano-bicyclo[2,2,1]-heptene-2, 5-ethyl-5-cyano-bicyclo[2,2,1]-heptene-2, 5-n-propyl-5-cyano-bicyclo[2,2,1]-heptene-2, 5-n-butyl-5-cyano-bicyclo[2,2,1]-heptene-2, 5-isobutyl-5-cyano-bicyclo[2,2,1]-heptene-2, 5-n-octyl-5-cyano-bicyclo[2,2,1]-heptene-2, 5-phenyl-5-cyano-bicyclo[2,2,1]-heptene-2, 5-cyclohexyl-5-cyano-bicyclo[2,2,1]-heptene-2, 5-(2-octenyl)-5-cyano-bicyclo[2,2,1]-heptene-2, 5,5-dicyano-bicyclo[2,2,1]-heptene-2, 5,6-dicyano-bicyclo[2,2,1]-heptene-2, 5-methyl-6-cyano-bicyclo[2,2,1]-heptene-2, 5-ethyl-6-cyano-bicyclo[2,2,1]-heptene-2, 5-n-butyl-6-cyano-bicyclo[2,2,1]-heptene-2, 5-isobutyl-6-cyano-bicyclo[2,2,1]-heptene-2, 5-phenyl-6-cyano-bicyclo[2,2,1]-heptene-2, 5-cyanomethyl-bicyclo[2,2,1]-heptene-2, 5-cyanoethyl-bicyclo[2,2,1]-heptene-2, 5-(cyano-n-butyl)-bicyclo[2,2,1]-heptene-2, 5-(cyano-isobutyl)-bicyclo[2,2,1]-heptene-2, 5-(ω-cyano-n-heptyl)-bicyclo[2,2,1]-heptene-2, and 5-cyanophenyl-bicyclo[2,2,1]-heptene-2. In this case, the substituent is attached to the chain in the endo and exo positions.

The ester type norbornene derivative used as a monomer in preparing the ring-opening polymerization product applied in the method of this invention contains at least one ester group or substituent including said ester group at the 5 and 6 positions of bicyclo[2,2,1]-heptene-2, as shown in the following general formula:

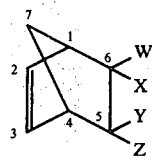

where: W, X, Y, Z = the same or different ones selected from the group consisting of hydrogen atom, ester group, hydrocarbon radicals selected from alkyl radical having 1 to 20 carbon atoms, alkenyl radical having 2 to 20 carbon atoms, cycloalkyl radical having 4 to 20 carbon atoms, alkyl substituted cycloalkyl radical having 5 to 20 carbon atoms, aryl radical having 6 to 20 carbon atoms and aralkyl radical having 7 to 20 carbon atoms, and said hydrocarbon radicals substituted by the ester group, at least one of said W, X, Y and Z being an ester group or said hydrocarbon radicals substituted by the ester group.

The above-mentioned ester type norbornene derivatives can be synthesized by the Diels-Alder reaction between cyclopentadiene and vinyl compounds containing an ester group or substituent including said ester group (for example, methyl acrylate, methyl methacrylate, dimethyl maleate, hexyl crotonate, and vinyl acetate), and also between dicyclopentadiene and said vinyl compounds.

Typical among the ester type norbornene derivatives each are 5-methoxycarbonyl-bicyclo[2,2,1]-heptene-2, 5-ethoxycarbonyl-bicyclo[2,2,1]-heptene-2, 5-butoxycarbonyl-bicyclo[2,2,1]-heptene-2, 5-allyloxycarbonyl-bicyclo[2,2,1]-heptene-2, 5-methyl-5-methoxycarbonyl-bicyclo[2,2,1]-heptene-2, 5-hexyloxycarbonyl-6-methyl-bicyclo[2,2,1]-heptene-2, 5-ethoxycarbonyl-6-phenyl-bicyclo[2,2,1]-heptene-2, 5-heptyl-6-octyloxycarbonyl-bicyclo[2,2,1]-heptene-2, 5-methoxycarbonyl-6-methoxycarbonylmethyl-bicyclo[2,2,1]-heptene-2, 5,6-dimethoxycarbonyl-bicyclo[2,2,1]-heptene-2, 5,6-diethoxycarbonyl-bicyclo[2,2,1]-heptene-2, 5,5-dibutoxycarbonylbicyclo[2,2,1]-heptene-2, 5-methyl-6,6-dimethoxycarbonylbicyclo[2,2,1]-heptene-2, 5-ω-methoxycarbonylheptyl-6-octylbicyclo[2,2,1]-heptene-2, 5-ω-methoxycarbonyl-2-decenyl-6-pentyl-bicyclo[2,2,1]-heptene-2, 5-ω-methoxycarbonylheptyl-6-2-octenylbicyclo[2,2,1]-heptene-2, 5-acetoxymethylbicyclo[2,2,1]-heptene-2, 5-acetoxy-bicyclo[2,2,1]-heptene-2, 5-propionoxymethyl-bicyclo[2,2,1]-heptene-2, and 5-stearoxymethyl-bicyclo[2,2,1]-heptene-2. In this case, the substituent is attached to the chain in the endo and exo positions.

For the object of this invention, the ring-opening polymerization homopolymers prepared from the respective types of norbornene derivatives may be used alone. Or it is possible to use copolymers obtained by the ring-opening polymerization of two or more of the above-mentioned types of norbornene derivatives or a mixture of more than 50 mol% of any of said norbornene derivatives as a main component and 50% at most of an unsaturated cyclic compound. This unsaturated cyclic compound may be typically exemplified by ether type norbornene derivatives, imide type norbornene derivatives, acid anhydride type norbornene derivatives, aromatic norbornadiene derivatives, ester type norbornadiene derivatives, aromatic nitrogen-bearing heterocyclic norbornene derivatives, amide type norbornene derivatives, aromatic norbornene derivatives, and aromatic dimethanooctahydronaphthalene derivatives, cycloolefinic compounds and halogenated norbornene derivatives.

Ether type norbornene derivatives used as a monomer in preparing the ring-opening polymerization product applied in the method of this invention contain at least one ether group or substituent including said ether group at the 5 and 6 positions of bicyclo-[2,2,1]-heptene-2, as shown in the following general formula:

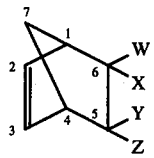

where: W, X, Y, Z = the same or different ones selected from the group consisting of hydrogen atom, ether group, hydrocarbon radicals selected from alkyl radical having 1 to 20 carbon atoms, alkenyl radical having 2 to 20 carbon atoms, cycloalkyl radical having 4 to 20 carbon atoms, alkyl substituted cycloalkyl radical having 5 to 20 carbon atoms, aryl radical having 6 to 20 carbon atoms and aralkyl radical having 7 to 20 carbon atoms, and said hydrocarbon radicals substituted by the ether group, at least one of said W, X, Y and Z being an ether group or said hydrocarbon radicals substituted by the ether group.

The hydrocarbon radicals substituted by the ether group include a methoxy radical, ethoxy radical, propoxy radical, n-butoxy radical, isobutoxy radical, n-octyloxy radical, methoxymethyl radical, 2-methoxyethyl radical, phenoxy radical and benzyloxy radical. The hydrocarbon radicals include a methyl radical, ethyl radical, propyl radical, n-butyl radical, isobutyl radical, octyl radical, phenyl radical, cyclohexyl radical and 2-octenyl radical.

The above-mentioned ether type norbornene derivatives can be synthesized by te Diels-Alder reaction between cyclopentadiene and vinyl compounds containing an ether group or substituent including said ether group (for example, methylvinyl ether, n-butylvinyl ether, cyclohexylvinyl ether, allylmethyl ether, 1,3-dimethoxypropylene, and phenylvinyl ether), and also between dicyclopentadiene and said vinyl compounds.

Typical among the ether type norbornene derivatives are 5-methoxy-bicyclo[2,2,1]-heptene-2, 5-ethoxy-bicyclo[2,2,1]-heptene-2, 5-n-propoxy-bicyclo[2,2,1]-heptene-2, 5-isopropoxybicyclo[2,2,1]-heptene-2, 5-n-butoxy-bicyclo[2,2,1]-heptene-2, 5-cyclohexoxy-bicyclo[2,2,1]-heptene-2, 5-methoxymethylbicyclo[2,2,1]-heptene-2, 5-butoxymethyl-bicyclo[2,2,1]-heptene-2, 5-methoxy-6-methoxymethyl-bicyclo[2,2,1]-heptene-2, and 5-phenoxy-bicyclo[2,2,1]-heptene-2. In this case, the substituent is attached to the chain in the endo and exo positions as in the cyano-substituted norbornene derivatives and ester type norbornene derivatives.

The imide type norbornene derivatives may be broadly divided into two types. One type is imide type norbornene derivatives obtained from those norbornene derivatives which contain a cyclic carboxylic anhydride group (hereinafter referred to as the "A-type imide type norbornene derivatives"). The other type is imide type norbornene derivatives obtained from norbornene derivatives containing an amino group and cyclic acid anhydrides (hereinafter referred to as the "B-type imide type norbornene derivatives").

The A-type imide type norbornene derivatives can be prepared by reacting primary amines with the later described norbornene derivatives containing an acid anhydride group which can be synthesized by the Diels-Alder reaction between cyclopentadiene or dicyclopentadiene and vinyl compounds containing a cyclic carboxylic anhydride group.

On the other hand, the B-type imide type norbornene derivatives can be easily obtained by reaction between the later described norbornene derivatives containing an amino group or substituent including said amino group and cyclic carboxylic anhydride, using a process resembling the N-phenyl maleimide synthesizing process proposed by M. P. Cava (Refer to "Organic Syntheses" by John D. Roberts, Vol. 41, pp. 93 to 95, 1961, published by John Wiley and Sons, Inc.).

Typical among the A-type imide type norbornene derivatives are N-substituted-3,6-methylene-1,2,3,6-tetrahydro-cis-phthalimide compounds, N-substituted-3,6-methylene-1-methyl-1,2,3,6-tetrahydro-cis-phthalimide compounds, bicyclo[2,2,1]-hepta-2-ene-5-spiro-3'-(N-substituted succinimide) compounds, 2-substituted-2-aza-1,3-dioxo-5,8-methano-1,2,3,4,4a,5,8,8a-octahydronaphthalene compounds, N-substituted-5,8-methano-1,2,3,4,4a,5,8,8a-octahydronaphthalene-2,3-dicarboxyimide compounds, N-substituted-5,8-methano-2-methyl-1,2,3,4,4a,5,8,8a-octahydronaphthalene-2,3-dicarboxyimide compounds, 1,4-methano-1,4,4a,5,6,7,8,8a-octahydronaphthalene-6-spiro-3'-(N-substituted succinimide) compounds, 2-substituted-2-aza-1,3-dioxo-5,8-methano-1,2,3,4,4a,5,8,8a,9,9a,10,10a-dodecahydroanthracene compounds, N-substituted-1,4,5,8-dimethano-1,2,3,4,4a,5,8,8a-octahydronaphthalene-2,3-dicarboxyimide compounds, N-substituted-1,4,5,8-dimethano-2-methyl-1,2,3,4,4a,5,8,8a-octahydronaphthalene-2,3-dicarboxyimide compounds, 1,4,5,8-dimethano-2-methyl-1,2,3,4,4a,5,8,8a-octahydronaphthalene-2,3-dicarboxyimide compounds, N-substituted-2-aza-5,8,9,10-dimethano-1,3-dioxo-1,2,3,4,4a,5,8,8a,9,9a,10, 10a-dodecahydroanthracene compounds, and N-substituted-4-(5-bicyclo[2,2,1]-hepta-2-enyl) phthalimide compounds.

The typical ones of the N-substituted-3,6-methylene-1,2,3,6-tetrahydro-cis-pthalimide compounds have the following general formula:

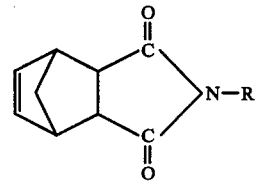

where:

R = a hydrocarbon radical selected from the group consisting of an alkyl radical having 1 to 10 carbon atoms, alkenyl radical having 2 to 10 carbon atoms, cycloalkyl radical or cycloalkenyl radical having 4 to 10 carbon atoms, aryl radical having 6 to 10 carbon atoms, aryl radical substituted by an alkyl radical having 1 to 10 carbon atoms and aralkyl radical having 7 to 10 carbon atoms, or — $(CH_2)_nCOOR'$ (where $n$ is an integer of 1 to 10 and R' denotes the abovementioned hydrocarbon radical) or — $(CH_2)_mOCOR''$ (where $m$ is an integer of 1 to 10 and R' represents the same hydrocarbon radical).

The N-substituted-3,6-methylene-1,2,3,6-tetrahydro-cis-phthalimide compounds may be typically exemplified by N-methyl-3,6-methylene-1,2,3,6-tetrahydro-cis-phthalimide, N-ethyl-3,6-methylene-1,2,3,6-tetrahydro-cis-phthalimide, N-hexyl-3,6-methylene-1,2,3,6-tetrahydro-cis-phthalimide, N-amyl-3,6-methylene-1,2,3,6-tetrahydro-cis-phthalimide, N-decyl-3,6-methylene-1,2,3,6-tetrahydro-cis-phthalimide, N-cyclohexyl-3,6-methylene-1,2,3,6-tetrahydro-cis-phthalimide, N-(4-methylcyclohexyl)-3,6-methylene-1,2,3,6-tetrahydro-cis-phthalimide, N-phenyl-3,6-methylene-1,2,3,6-tetrahydro-cis-phthalimide, N-(4-ethylphenyl)-3,6-methylene-1,2,3,6-tetrahydro-cis-phthalimide, N-methoxycarbonyl-3,6-methylene-1,2,3,6-tetrahydro-cis-phthalimide, N-ethoxycarbonylmethyl-3,6-methylene-1,2,3,6-tetrahydro-cis-phthalimide, and N-acetoxy-3,6-methylene-1,2,3,6-tetrahydro-cis-phthalimide.

Other A-type imide type norbornene derivatives than the N-substituted-3,6-methylene-1,2,3,6-tetrahydro-cis-phthalimide compounds may be typically exemplified in the same manner as described above. Said other A-type imide type norbornene derivatives have such a general formula as set forth in the Japanese Patent Application No. 123329/73.

The B-type imide type norbornene derivatives typically include N-[ω-(5-bicyclo[2,2,1]-hepta-2-enyl)alkyl substituted]-maleimide compounds, N-ω-(5-bicyclo[2,2,1]-hepta-2enyl)alkyl substituted]-citraconimide compounds, N-[ω-(5-bicyclo [2,2,1]-hepta-2-enyl) alkyl substituted]-glutaconimide compounds, N-[ω-(5-bicyclo[2,2,1]-hepta-2-enyl)alkyl substituted]-succinimide compounds, N-[ω(5-bicyclo[2,2,1]-hepta-2-enyl)alkyl substituted]-phthalimide compounds, N-[ω(5bicyclo [2,2,1]hepta-2-enyl)alkyl substituted]-naphthalene-1,8-dicarboxyimide compounds, and N-[ω-(5-bicyclo[2,2,1]-hepta-2-enyl)alkyl substituted]-naphthalene-2,3-dicarboxyimide compounds.

The typical ones of the N-[ω-(5-bicyclo[2,2,1]-hepta-2-enyl)alkyl substituted[ maleimide compounds may be expressed by the following general formula:

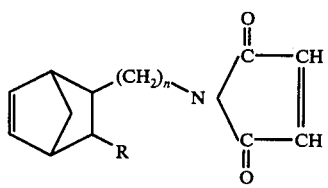

where:
R = an alkyl radial having 1 to 20 carbon atoms
n = an integer of 1 to 20.

Typical among the N-[ω-(5-bicyclo[2,2,1]-hepta-2-enyl) alkyl substituted]maleimide compounds are N-(5-bicyclo[2,2,1]-hepta-2-enyl)methylmaleimide, N-[3-(5-bicyclo[2,2,1]-hepta-2-enyl)propyl]maleimide, N-[6-(5-bicyclo[2,2,1]-hepta-2-enyl) hexyl]maleimide, N-[12-(5-bicyclo[2,2,1]-hepta-2-enyl) dodecyl]maleimide, N-6-methyl-5-bicyclo[2,2,1]-hepta-2-enyl)methylmaleimide, N-[4-(6-methyl-5-bicyclo[2,2,1]-hepta-2-enyl)butyl]-maleimide, N-[10-(6-methyl-5-bicyclo[2,2,1]-hepta-2-enyl)decyl]maleimide, N-[16-(6-methyl-5-bicyclo[2,2,1]-hepta-2-enyl)hexadecyl]maleimide, N-(6-ethyl-bicyclo[2,2,1]-hepta-2-enyl)methylmaleimide, N-[2-(6-ethyl-5-bicyclo[2,2,1]-hepta-2-enyl)ethyl]maleimide, N-[8-(6-ethyl-5-bicyclo[2,2,1]-hepta-2-enyl)octyl]maleimide, N-[18-(6-ethyl-5-bicyclo[2,2,1]-hepta-2-enyl)octadecyl]maleimide, N-[3-(6-propyl-5-bicyclo[2,2,1]-hepta-2-enyl)propyl]maleimide, N-[9-(6-propyl-5-bicyclo[2,2,1]-hepta-2-enyl)nonyl]maleimide, N-[11-(6-butyl-5-bicyclo[2,2,1]-hepta-2-enyl)undecyl]-maleimide, N-(6-hexyl-5-bicyclo[2,2,1]-hepta-2-enyl)-methylmaleimide, N-(6-dodecyl-5-bicyclo[2,2,1]-hepta-2enyl)methylmaleimide, N'-[12-(6-dodecyl-5-bicyclo[2,2,1]-hepta-2-enyl)dodecyl] maleimide, and N-(6-octadecyl-5-bicyclo[2,2,1]-hepta-2-enyl)methylmaleimide.

Other B-type imide type norbornene derivatives than the N-[ω-(5-bicyclo[2,2,1]-hepta-2-enyl)alkyl substituted] maleimide compounds may be typically exemplified in the same manner as described above. Said other B-type imide type norbornene derivatives may be expressed by such general formula as presented in the Japanese patent application No. 123329/73.

Typical among the acid anhydride type norbornene derivatives are 3,6-methylene-1,2,3,6-tetrahydro-cis-phthalic anhydride, 6-(5-carboxy-bicyclo[2,2,1]-hepta-2-enyl)acetic anhydride, 3,6-methano-1-methyl-1,2,3,6-tetrahydro-cisphthalic anhydride, 2-oxa-1,4-dioxo-5,8-methanol-1,2,3,4,4a, 5,8,8a-octahydronaphthalene, 5,8-methanol-1,2,3,4,4a,5,8,8a-octahydronaphthalene-1,2-dicarboxylic anhydride, 5,8-methano-1-methyl-1,2,3,4,4a,5,8,8a-octahydronaphthalene-2,3-dicarboxylic anhydride, 4,7-methano-1-methyl-1,2,3,3a,4, 7,7a,8-naphthalene-1,2-dicarboxylic anhydride, 1,4,5,8-dimethano-1,2,3,4,4a,5,8,8a-octahydronaphthalene-2,3-dicarboxylic anhydride, 2-oxa-1,3-dioxo-1,2,3,4,4a,5,8,8a,9,9a,10,10a-dodecahydroanthracene and 4-(5-bicyclo[2,2,1]-hepta-2-enyl) phthalic anhydride.

These formulas are already indicated in the Japanese patent application No. 106902/73.

The aromatic norbornene derivatives contain at least one aromatic hydrocarbon radical or substituent including said aromatic hydrocarbon radical at the 5 and/or 6 position of the bicyclo[2,2,1]-heptene-2 (namely, norbornene). The typical ones of said aromatic norbornene derivatives may be expressed by the following general formula (A):

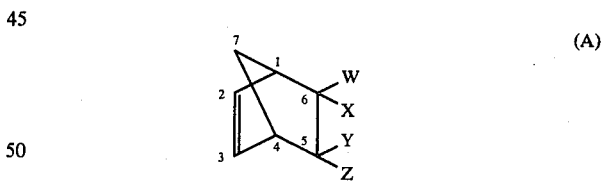

The aromatic dimethanooctahydronaphthalene derivatives contain at least one aromatic hydrocarbon radical or substituent including said aromatic hydrocarbon radical at the 2 and/or 3 position of the 1,4:5,8-dimethano-1,2,3,4,5,8,8a-octahydronaphthalene. The typical ones of said aromatic dimethanooctahydronaphthalene derivatives may be expressed by the following general formula (B):

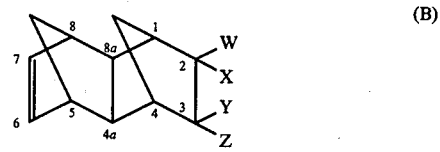

Throughout the above structural formulas (A), (B), W, X, Y, Z may denote the same or different ones selected from the group consisting of a hydrogen atom, aromatic hydrocarbon radical, substituent including said aromatic hydrocarbon radical, and alkyl radical having 1 to 20 carbon atoms or alkenyl radical having 2 to 20 carbon atoms. In this case, at least one of said W, X, Y, Z is an aromatic hydrocarbon radical or substituent including said aromatic hydrocarbon radical. Said substituent may be expressed by any of the following general formulas:

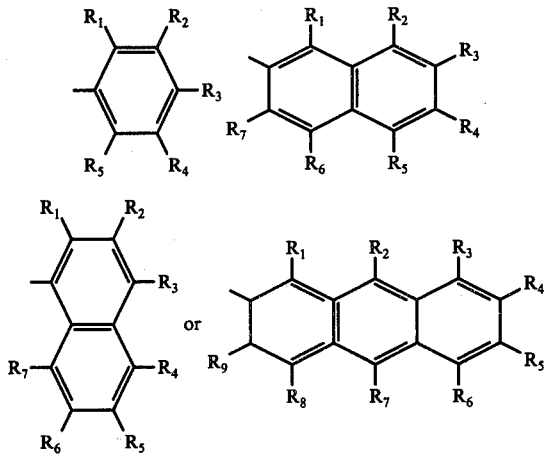

where: $R_1, R_2, R_3, R_4, R_5, R_6, R_7, R_8, R_9$ = the same or different ones selected from the group consisting of a hydrogen atom, alkyl or alkenyl radical having 1 to 20 carbon atoms, cycloalkyl radical having 4 to 10 carbon atoms, aryl radical having 6 to 10 carbon atoms and aralkyl radical having 7 to 10 carbon atoms.

The aromatic norbornene derivatives typically include 5-phenyl-bicyclo[2,2,1]-heptene-2,5-methyl-5-phenyl-bicyclo[2,2,1]-heptene-2, 5,5-diphenyl-bicyclo[2,2,1]-heptene-2, 5-hexyl-5-phenyl-bicyclo[2,2,1]-heptene-2, 5-decenyl-5-phenyl-bicyclo[2,2,1]-heptane-2, 5-cyclohexyl-5-phenyl-bicyclo[2,2,1]-heptene-2, 5-phenyl-6-ethyl-bicyclo[2,2,1]-heptene-2, 5-α-naphthyl-bicyclo[2,2,1]-heptene-2, and 5-(P-tolyl)-bicyclo[2,2,1]-heptene-2.

The aromatic dimethanooctahydronaphthalene derivatives may be typically exemplified by 2-phenyl-1,4:5,8-dimethano-1,2,3,4,4a,5,8,8a-octahydronaphthalene, 2-methyl-2-phenyl-1,4:5,8-dimethano-1,2,3,4,4a,5,8,8a-octahydronaphthalene, 2-n-butyl-2-phenyl-1,4:5,8-dimethano-1,2,3,4,4a,5,8,8a-octahydronaphthalene, 2-cyclohexyl-1,4:5,8-dimethano-1,2,3,4,4a,5,8,8a-octahydronaphthalene, 2,2,2- or 2,3-diphenyl-1,4:5,8-dimethano-1,2,3,4,4a,5,8,8a-octahydronaphthalene, 2-(p-tert-butyl-phenyl)-1,4:5,8-dimethano-1,2,3,4,4a,5,8,8a-octahydronaphthalene, 2-decyl-2-phenyl-1,4:5,8-dimethano-1,2,3,4,4a,5,8,8a-octahydronaphthalene, and 2-α-anthranyl-1,4:5,8-dimethano-1,2,3,4,4a,5,8,8a-octahydronaphthalene.

Other aromatic norbornene derivatives and aromatic dimethanooctahydronaphthalene derivatives than described above as well as the method of preparing the same are set forth in the Japanese patent application No. 61851/74.

The aromatic nitrogen-bearing heterocyclic norbornene derivatives contain at least one aromatic heterocyclic ring having at least one nitrogen atom in said ring (for example, pyridine nucleus, or quinoline nucleus) in the 5 and/or 6 position of the norbornene (namely, bicyclo[2,2,1]-heptene-2) (Refer to the item "Aromatic Character" of the "Chemical Encyclopedia", Vol. 8, p. 601, 1969, published by Kyoritsu Publishing Co., Ltd.). The typical ones of the aromatic nitrogen-bearig heterocyclic norbornene derivatives may be expressed by the following general formula:

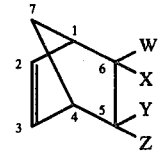

where: W, X, Y, Z = the same or different ones selected from the group consisting of a hydrogen atom, alkyl radical having 1 to 20 carbon atoms, cycloalkyl radical having 4 to 10 carbon atoms, alkyl substituted cycloalkyl radical having 5 to 10 carbon atoms, aryl radical having 6 to 10 carbon atoms and aralkyl radical having 7 to 10 carbon atoms or other radicals containing an aromatic nitrogen-bearing heterocyclic ring, at least one of said W, X, Y, Z being a radical containing said aromatic nitrogen-bearing heterocyclic ring.

Typical among the aromatic nitrogen-bearing heterocyclic norbornene derivatives are 5-(2-pyridyl)-bicyclo[2,2,1]-heptene-2, 5-(3-pyridyl)-bicyclo[2,2,1]-heptene-2, 5-(4-pyridyl)-bicyclo[2,2,1]-heptene-2, 5-(3-methyl-2-pyridyl)-bicyclo[2,2,1]-heptene-2, 5-(5-n-butyl-3-pyridyl)-bicyclo[2,2,1]-heptene-2, 5-(4-cyclohexyl-2-pyridyl)-bicyclo[2,2,1]-heptene-2, 5-(3-phenyl-4-pyridyl)-bicyclo[2,2,1]-heptene-2, 5-(2,6-dimethyl-4-pyridyl)-bicyclo[2,2,1]-heptene-2, 5-(3-hexyl-2-pyridyl)-bicyclo[2,2,1]-heptene-2, 5-(4-quinolyl)-bicyclo[2,2,1]-heptene-2, 5-(9-carbazolyl)-bicyclo[2,2,1]-heptene-2, 5-(9-propyl-3-carbazolyl)-bicyclo[2,2,1]-heptene-2, and 5-(9-dodecyl-3-carbazolyl)-bicyclo[2,2,1]-heptene-2. The other aromatic nitrogen-bearing heterocyclic norbornene derivatives are typically set forth in the Japanese patent application No. 15310/74.

The amide type norbornene derivatives contain at least one N,N-disubstituted carbonamide radical or substituent including said N,N-disubstituted carbonamide radical at the 5 and/or 6 positions of the bicyclo[2,2,1]-heptene-2. The typical ones of said amine type norbornene derivatives may be expressed by the following general formula:

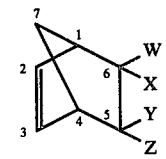

where: W, X, Y, Z = the same or different ones selected from the group consisting of a hydrogen atom alkyl radical having 1 to 12 carbon atoms, alkenyl radical having 2 to 12 carbon atoms, cycloalkyl radical having 4 to 12 carbon atoms, alkyl substituted cycloalkyl radical having 5 to 12 carbon atoms, aryl radical having 6 to 10 carbon atoms and aralkyl radical having 7 to 10 carbon atoms or N-disubstituted carbonamide radical

where R,R' denote the same or different ones selected from the group consisting of a hydrogen atom and the above-mentioned hydrocarbon radicals).

The amide type norbornene derivatives typically include N,N-dimethyl-bicyclo[2,2,1]-heptene-2-carbonamide-5, N-methyl-N-ethyl-bicyclo[2,2,1]-heptene-2-carbonamide-5, N-methyl-N-octyl-bicyclo[2,2,1]-heptene-2-carbonamide-5, N,N-dicyclohexyl-bicyclo[2,2,1,]-heptene-2-carbonamide-5, N,N-di(methylcyclohexyl)-bicyclo[2,2,1]-heptene-2-carbonamide-5, N,N-diphenyl-bicyclo[2,2,1]-heptene-2-carbonanide-5, N,N-dibenzyl-bicyclo[2,2,1]-heptene-2-carbonamide-5, N,N-di(3-methylphenyl)-bicyclo[2,2,1]-heptene-2-carbonamide-5, N,N-dimethyl-5-methyl-bicyclo[2,2,1]-heptene-2-carbonamide-5, N,N-dimethyl-5,6-methyl-bicyclo[2,2,1]-heptene-2-carbonamide-5, N,N-diethyl-5-hexyl-bicyclo[2,2,1]-heptene-2-carbonamide-5, N,N-di(-cyclohexyl)-5-phenyl-bicyclo[2,2,1]-heptene-2-carbonamide-5, N,N-diphenyl-5-methyl-bicyclo[2,2,1]-heptene-2-carbonamide-5, and N,N,N',N'-tetramethyl-bicyclo[2,2,1]-heptene-2-carbonamide-5. The other amide type norbornene derivatives are typically indicated in the Japanese patent application No. 129581/74.

The aromatic norbornadiene derivatives are the compounds in which carbon atoms occupying the 5 and 6 positions of the formula (C) of the bicyclo[2,2,1]-heptene-2 [namely, norbornene] concurrently constitute the two adjacent carbon atoms of an aromatic cyclic compound. The typical ones of said aromatic norbornadiene derivatives may be expressed by either of the following general formulas (D) and (E):

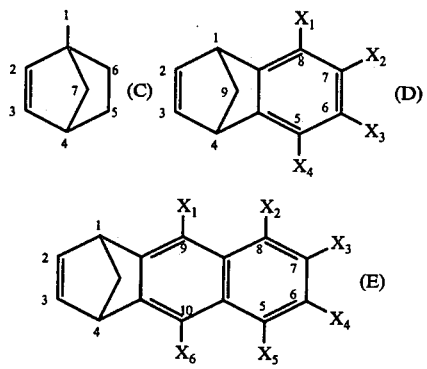

where: $X_1$, $X_2$, $X_3$, $X_4$, $X_5$, $X_6$ = the same or different ones selected from the group consisting of a hydrogen atom, alkyl radical having 1 to 10 carbon atoms, alkenyl radical having 2 to 10 l carbon atoms, cycloalkyl radical having 4 to 10 carbon atoms, aryl radical having 6 to 10 carbon atoms and aralkyl radical having 7 to 10 carbon atoms or polar radical selected from the group consisting of a nitrile group, ester group and halogen atom or the abovementioned hydrocarbon radicals containing said polar radicals.

The aromatic norbornadiene derivatives may be typically exemplified by 1,4-dihydro-1,4-methanonaphthalene, 1,4-dihydro-1,4-methano-6-methylnaphthalene, 1,4-dihydro-1,4-methano-6-methoxynaphthalene, 1,4-dihydro-6-fluoro-1,4-methanonaphthalene, 6-chloro-1,4-dihydro-1,4-methanonaphthalene, 6-cyano-1,4-dihydro-1,4-methanonaphthalene, 5,8-diacetoxy-1,4-dihydro-1,4-methanonaphthalene, 5,8-diacetoxy-1,4-dihydro-6,7-dimethyl-1,4-methanonaphthalene, 9,10-diacetoxy-1,4-dihydro-1,4-methanoanthracene, and 1,4-dihydro-9,10-diphenyl-1,4-methanoanthracene. The method of preparing the aromatic norbornadiene derivatives and the typical examples thereof are described in the Japanese patent application No. 109295/73.

The ester type norbornadiene derivatives have at least one ester group or substituent containing said ester group at the 2 and 3 positions of the bicyclo[2,2,1]-heptadiene-2,5. The typical ones of said ester type norbornadiene derivatives may be expressed by the following general formula:

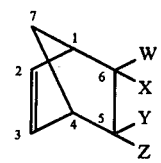

where: X, Y = the same or different ones selected from the group consisting of a hydrogen atom, alkyl radical having 1 to 10 carbon atoms, alkenyl radical having 2 to 10 carbon atoms, cycloalkyl radical having 4 to 10 carbon atoms, alkyl substituted cyclo radical having 5 to 10 carbon atoms, aryl radical having 6 to 10 carbon atoms and aralkyl radical having 7 to 10 carbon atoms, ester group and hydrocarbon radicals substituted by the ester group, at least one of said X and Y denoting an ester group or said hydrocarbon radicals substituted by the ester group.

The ester type norbornadiene derivatives typically include 2-methoxycarbonyl-bicyclo[2,2,1]-hepta-2,5-diene, 2-butyloxycarbonyl-bicyclo[2,2,1]-hepta-2,5-diene, 2-octyloxycarbonyl-bicyclo[2,2,1]-hepta-2,5-diene, 2-decyloxycarbonyl-bicyclo[2,2,1]-hepta-2,5-diene, 2-methoxycarbonyl-3-methyl-bicyclo[2,2,1]-hepta-2,5-diene, 2-ethoxycarbonyl-3-hexyl-bicyclo[2,2,1]-hepta-2,5-diene, 2-methoxycarbonyl-3-cyclohexyl-bicyclo[2,2,1]-hepta-2,5-diene, 2-ethoxy-3-(4-methylcyclohexyl)-bicyclo[2,2,1]-hepta-2,5-diene, 2-methoxycarbonyl-3-phenyl-bicyclo[2,2,1]-hepta-2,5-diene, 2-ethoxycarbonyl-3-tolyl-bicyclo[2,2,1]-hepta-2,5-diene, 2,3-dimethoxycarbonyl-bicyclo[2,2,1]-hepta-2,5-diene, 2-methoxycarbonyl-3-ethoxycarbonyl-bicyclo[2,2,1]-hepta-2,5-diene, 2-acetoxymethyl-bicyclo[2,2,1]-hepta-2,5-diene, 2-caproyloxy-3-methyl-bicyclo[2,2,1]-hepta-2,5-diene, 2-ethoxycarbonyl-3-hexyloxycarbonyl-bicyclo[2,2,1]-hepta-2,5-diene, 2,3-di(propionyloxymethyl)-bicyclo[2,2,1]-hepta-2,5-diene, 2-acetoxymethyl-3-cyclohexyl-bicyclo[2,2,1]-hepta-2,5-diene, 2-valeryloxy-3-ethyl-bicyclo[2,2,1]-hepta-2,5-diene, 2-valeryloxymethyl-decyl-bicyclo[2,2,1]-hepta-2,5-diene, and 2-valeryloxymethyl-3-phenyl-bicyclo[2,2,1]-hepta-2,5-diene.

The method of preparing the ester type norbornadiene derivatives and the other typical examples thereof than listed above are set forth in the Japanese patent application No. 9208/74.

The cycloolefinic compounds in the unsaturated cyclic compounds used as a monomer in preparing the ring-opening polymerization copolymer applied in the method of this invention may be broadly divided into three groups: (1) nonconjugated cyclic polyene compounds having at least two carbon-carbon double bonds (hereinafter referred to as "nonconjugated cyclic polyene compounds"), (2) monocyclic olefin compounds and (3) polycyclic olefinic compounds having one carbon-carbon double bond (hereinafter referred to as "polycyclic olefinic compounds").

For the object of this invention, the nonconjugated cyclic polyene compounds may be of the monocyclic or polycyclic type, and are preferred to contain 6 to 20 carbon atoms for preparation of the ring-opening polymerization product applied in the method of this invention. Said nonconjugated cyclic polyene compounds typically include 1,5-cyclooctadiene, dicyclopentadiene, 1,5,9-cyclododecatriene, 1-chloro-1,5-cyclooctadiene, and norbornadiene.

The monocyclic olefinic compounds are preferred to contain 20 carbon atoms at most for preparation of the ring-opening polymerization product applied in the method of this invention, and may be typically exemplified by cyclobutene, cyclopentene, cycloheptene, cyclooctene and cyclododecene.

The polycyclic olefinic compounds are preferred to contain 20 carbon atoms at most for preparation of the ring-opening polymerization product applied in the method of this invention and typically include bicyclo[2,2,1]-heptene-2(norbornene), 5-methyl-bicyclo[2,2,1]-heptene-2, 5,5 or 5,6 dimethyl-bicyclo[2,2,1]-heptene-2, 1,4:5,8-dimethano-1,2,3,4,4a,5,8,8a-octahydronaphthalene, 2-methyl-1,4:5,8-dimethano-1,2,3,4,4a,5,8,8a-octahydronaphthalene, isoprophenyl-bicyclo[2,2,1]-heptene-2, 2-n-propyl-1,4:5,8-dimethano-1,2,3,4,4a,5,8,8a-octahydronaphthalene.

Further, the unsaturated cyclic compounds used as a monomer in preparing the ring-opening copolymerization products applied in the method of this invention include halogenated norbornene derivatives.

The halogenated norbornene derivatives contain at least one halogen atom or substituent including said halogen atom at the 5 and/or 6 positions of the bicyclo[2,2,1]-heptene-2, as shown in the following general formula:

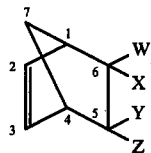

where: W, X, Y, Z = the same or different ones selected from the group consisting of hydrogen atom, halogen atom, hydrocarbon radicals selected from alkyl radical having 1 to 20 carbon atoms, alkenyl radical having 2 to 20 carbon atoms, cycloalkyl radical having 4 to 20 carbon atoms, alkyl substituted cycloalkyl radical having 5 to 20 carbon atoms, aryl radical having 6 to 20 carbon atoms, and aralkyl radical having 7 to 20 carbon atoms, and said hydrocarbon radicals substituted by the halogen atom, at least one of said W, X, Y and Z being a halogen atom, or said hydrocarbon radicals substituted by the halogen atom.

The above-mentioned halogenated norbornene derivatives can be synthesized by the Diels-Alder reaction between cyclopentadiene and halogen atom-bearing compounds (for example, vinyl chloride, 1,2-dichloroethylene, vinyl bromide, and vinylidene chloride), and also between said halogen atom-bearing compounds and dicyclopentadiene. Typical among the halogen type norbornene derivatives are 5-chloro-bicyclo[2,2,1-heptene-2, 5,5-dichloro-bicyclo[2,2,1]-heptane-2, 5,6-dichloro-bicyclo[2,2,1]-heptene-2, 5,5,6-trichloro-bicyclo[2,2,1]-heptene-2, 5,5,6,6-tetrachloro-bicyclo[2,2,1]-heptene-2, 5-chloromethyl-bicyclo[2,2,1]-heptene-2, 5,6-dichloromethyl-bicyclo[2,2,1]-heptene-2, 5-chloro-5-methyl-bicyclo[2,2,1]-heptene-2, 5-chloro-6-methyl-bicyclo[2,2,1]-heptene-2, 5-chloromethyl-6-methyl-bicyclo[2,2,1]-heptene-2, 5-(β-chloroethyl)-bicyclo[2,2,1]-heptene-2, 5-(α-chloroethyl)-bicyclo[2,2,1]-heptene-2, 5-(β-chloropropyl)-bicyclo[2,2,1]-heptene-2, 5-(γ-chrolopropyl)-bicyclo[2,2,1]-heptene-2, 5-(β-chloroethyl)-6-methyl-bicyclo[2,2,1]-heptene-2, and 5-chloromethyl-6-ethyl-bicyclo[2,2,1]-heptene-2.

The cyano-, ester-, ether-, acid anhydride-, amide- and aromatic-type norbornene derivatives, chlorinated norbornene derivatives, aromatic dimethanooctahydronaphthalene derivatives, aromatic nitrogen-bearing heterocyclic norbornene derivatives and some (for example, 5-methyl-bicyclo[2,2,1]-heptene-2) of the cycloolefinic compounds all have two forms of isomers which are designated as the endo- and exo-types according to the manner in which the substituent is attached to the chain. For the object of preparing the ring-opening polymerization product applied in the method of this invention, the above-listed compounds may be used either after separating said isomers, for example, by precision distillation or recrystallization or without separating said isomers, that is, in the form still mixed therewith.

In the case of cyano-, ester- and ether-type norbornene derivatives, a larger total number of carbon atoms contained in the radicals represented by W, X, Y, Z given in the general formulas of said derivatives undesirably leads to the lower heat resistance of the resultant ring-opening polymerization product and in consequence the composition intended by this invention. Therefore, the radicals denoted by W, X, Y, Z are preferably chosen to contain 10 carbon atoms at most, or more preferably 6 carbon atoms at most in total.

Similarly with the chlorinated norbornene derivatives in the unsaturated cyclic compounds, a larger total number of carbon atoms contained in the radicals indicated by W, X, Y, Z undesirably results in the lower heat resistance of the ring-opening polymerization product obtained and in consequence the composition intended by this invention. Accordingly, said total number of carbon atoms is desired to fall below 10, or more preferably 6 at most.

A ring-opening polymerization product prepared from those of the chlorinated norbornene derivatives which contain two or more chlorine atoms displays not only excellent flame retardancy but also high heat resistance and is particularly favorable where it is desired to provide a composition possessed of such prominent properties.

The ring-opening polymerization product prepared from those of the A-type imide type norbornene derivatives in which the radical represented by R given in the general formula has a large number of carbon atoms and the ring-opening polymerization product prepared from those of the B-type imide type norbornene derivatives in which the radical denoted by R given in the general formula has a large number of carbon atoms and also n indicated in said formula represents a large integer generally have low heat resistance or workability. Where, therefore, it is desired to obtain a composition possessed of excellent heat resistance or workability, application of the above-mentioned forms of ring-opening polymerization product is not preferred. Consequently, with the A-type imide type norbornene derivatives, the radical indicated by R given in the general formula is preferably chosen to contain 8 carbon atoms at most, or more preferably 6 carbon atoms at most. With the B-type imide type norbornene derivatives the radical denoted by R given in the general formula is preferably chosen to have 6 carbon atoms at most, or more preferably 4 carbon atoms at most, and $n$ given in said formula is preferably chosen to be an integer of 6 at most, or more preferably 4 at most.

With the amide- and aromatic-type norbornene derivatives, aromatic dimethanooctahydronaphthalene derivatives and aromatic nitrogen-bearing heterocyclic norbornene derivatives, a larger total number of carbon atoms contained in the radicals represented by W, X, Y, Z given in the general formula undesirably gives rise to the lower heat resistance of the resultant ring-opening polymerization product, and in consequence the composition obtained therefrom. Therefore, the radicals denoted by said W, X, Y, Z are preferably chosen to contain 8 carbon atoms at most or more preferably 6 carbon atoms at most in total.

With the acid anhydride type norbornene derivatives, in the unsaturated cyclic compounds, a larger number of carbon atoms contained in the other rings than in the norbornene ring undesirably decreases the mechanical properties, and further heat resistance or workability of the resultant ring-opening polymerization product. With the acid anhydride type norbornene derivatives, the other rings than the norbornene ring are preferably chosen to contain 2 to 10 or more preferably 2 to 8 carbon atoms.

With the aromatic norbornadiene derivatives, a larger number of carbon atoms contained in the other rings than in the norbornadiene ring generally tends to decrease the mechanical properties, further heat resistance or workability of the resultant ring-opening polymerization product. Therefore, such form of aromatic norbornadiene derivatives is not acceptable where it is desired to provide a composition possessed of prominent mechanical properties, heat resistance and workability. Accordingly, the other rings than the norbornadiene ring are preferably chosen to contain 20 carbon atoms at most, or more preferably 16 carbon atoms at most.

With the ester type norbornadiene derivatives, a larger total number of carbon atoms contained in the radicals represented by X, Y given in the general formula tends to reduce the mechanical properties and further heat resistance or workability of the resultant ring-opening polymerization product. Such form of ester type norbornadiene derivatives is not preferred where it is demanded to provide a composition possessed of excellent mechanical properties, heat resistance and workability. Therefore, the radicals denoted by X, Y given in the general formula of said ester type norbornadiene derivatives are preferably chosen to contain a total number of 16 carbon atoms at most, or more preferably 12 carbon atoms at most.

Obviously, the above-mentioned requirements are governed by the proportions of the aforesaid unsaturated cyclic compounds contained in the ring-opening polymerization copolymer. Also, the above-mentioned requirements are of course affected by various polymerization conditions in preparation of the ring-opening polymerization product, such as the kind and proportion of a catalytic system, the kind and proportion of a third catalytic component when applied or omission thereof, the proportion of the catalytic system based on the monomer, polymerization temperature, and the kind and proportion of a molecular weight-controlling agent when applied or omission thereof.

Where ring-opening copolymerization is carried out between unsaturated cyclic compounds and norbornene derivatives of the cyano- and ester-types, the proportion of said unsaturated cyclic compounds is chosen to be 50 mol% at most. Ring-opening polymerization copolymers of said various types of norbornene derivatives and more than 50 mol% of said unsaturated cyclic compounds are not desired, because such form of copolymer often gives rise to decreases in mechanical properties such as impact strength, impact strength at low temperature, tensile strength and hardness, and other physical properties such as heat resistance (for example, softening point), moldabilty, gas impermeability and transparency, as compared with the ring-opening polymerization homopolymers prepared from the cyano-, ester-type norbornene derivatives respectively or copolymers of combination of said derivatives.

Ring-opening polymerization copolymers containing a relatively large amount of ether-type norbornene derivatives or monocyclic olefinic compounds (for example, cyclohexene and cyclooctene) generally have good impact strength but undesirably tend to decrease in heat resistance (softening point), mechanical properties such as tensile strength and hardness. During preparation of a ring-opening polymerization copolymer containing a relatively large amount of polycyclic olefinic compounds and nonconjugated cyclic polyene compounds (for example, dicyclopentadiene and norbornene), gelation sometimes takes place, decreasing the workability of said copolymer and consequently presenting difficulties in providing satisfactory moldings.

It is seen from the foregoing description that among the unsaturated cyclic compounds, the ether or cyclic olefin type norbornene derivatives contained in the ring-opening polymerization copolymers are generally chosen to account for 40 mol% at most or preferably 20 mol% at most.

Ring-opening polymerization copolymers containing a relatively large amount of the imide type norbornene derivatives of the A or B type included in the unsaturated cyclic compounds generally have good heat resistance indeed. But said copolymers are not desired, because they not only have low impact strength, but also, when heated in being kneaded in a molten state or molded, are objectionably colored due to deterioration, and are decomposed or gelled in part or whole, thus presenting reduced workability. Therefore, the proportion of the imide type norbornene derivatives of the A type contained in the ring-opening polymerization copolymers is chosen to be smaller than 45 mol% or preferably smaller than 20 mol%.

The proportion of the imide type norbornene derivatives of the B type contained in the ring-opening polymerization copolymers is chosen to be smaller than 20 mol% or preferably smaller than 10 mol%.

Ring-opening polymerization copolymers containing a relatively large amount of the acid anhydride type norbornene derivatives included in the unsaturated cyclic compounds have good heat resistance like similar copolymers containing the imide type norbornene derivatives of the A type. But the former copolymers are not acceptable, because they not only have low impact strength, but also, when heated, are deteriorated or gelled in part or whole, presenting difficulties in molding.

Ring-opening polymerization copolymers containing a large amount of acid anhydride type norbornene derivatives often become insoluble in many kinds of inert organic solvent, undesirably imposing limitations on the manufacturing process Ring-opening polymerization copolymers containing a relatively large amount of aromatic nitrogen-bearing heterocyclic norbornene derivatives generally have a low softening point and unsatisfactory chemicals-resistance.

From the above-mentioned facts, a preferred form of ring-opening polymerization copolymer is such that the copolymerization proportion of acid anhydride type norbornene derivatives or aromatic nitrogen-bearing heterocyclic norbornene derivatives in said copolymer is less than 25 mol%, more preferably less than 10 mol%.

Ring-opening polymerization copolymers containing a relatively large amount of amide type norbornene derivatives are often subject to limitation in manufacture due to the low polymerization activity of said derivatives. However, ring-opening polymerization copolymers containing a relatively small amount (generally less than 20 mol%) of amide type norbornene derivatives display good antistaticity. Therefore, this form of copolymer is preferably chosen to contain 20 mol% at most, more preferably 10 mol% at most of said amide type norbornene derivatives.

Ring-opening polymerization copolymers containing a relatively large amount of aromatic norbornene derivatives or aromatic dimethanooctahydronaphthalene derivatives often give rise to gelation during manufacture, undesirably decreasing the moldability of said copolymer. If, however, containing a relatively small amount of said unsaturated cyclic compounds, such form of copolymer has a larger molecular weight (or higher reduced viscosity) and more prominent mechanical properties such as impact strength and tensile strength than the ring-opening polymerization homopolymer of chlorinated norbornene derivatives and ring-opening polymerization copolymer of any combination of the cyano- and ester-type norbornene derivatives, and offers great advantage in practising this invention. Therefore, the above-mentioned form of ring-opening polymerization copolymer is generally chosen to contain less than 3 mol%, preferably less than 1 mol% of said aromatic norbornene derivatives or aromatic dimethanooctahydronphthalene derivatives.

Ring-opening polymerization copolymers containing a relatively large amount of aromatic norbornadiene derivatives or ester type norbornadiene derivatives generally have a relatively high softening point and low moldability (requiring high molding temperature). Moreover, such form of ring-opening polymerization copolymer is disadvantageous, because it is necessary to devise a process for suppressing the gelation of said copolymer during molding. Since, however, a ring-opening polymerization copolymer containing a relatively small amount of such aromatic norbornadiene derivatives or ester-type norbornadiene derivatives has good heat resistance, the proportion of said derivatives is preferably chosen to be 15 mol% at most, more preferably 10 mol% at most. Obviously, the proportion of the above-mentioned unsaturated cyclic compounds is largely governed by the kind thereof and the conditions in which a ring-opening polymerization copolymer is prepared by reaction between said compounds and other components.

The B-type imide-, acid anhydride- and aromatic-type norbornene derivatives, aromatic dimethanooctahydronaphthalene derivatives, aromatic nitrogen-bearing heterocyclic norbornene derivatives and ester type norbornadiene derivatives tend to give rise to crosslinking by heating when a ring-opening polymerization copolymer is prepared or when the resultant copolymer is kneaded and molded. Said copolymer has a considerably high softening point and imposes limitation on the temperature at which it is kneaded and molded, thus presenting great difficulties in molding. The amide type norbornene derivatives undesirably reduce the activity of a catalytic system applied in preparing a ring-opening polymerization product.

As seen from the foregoing description, such form of ring-opening polymerization product as does not tend to be gelation should be used in practising this invention, for otherwise molding would be obstructed.

As used in the method of this invention, ring-opening polymerization homopolymers of the cyano- and ester-type, norbornene derivatives respectively or ring-opening polymerization copolymers of combination of said derivatives or other copolymers of said derivatives and 50 mol% at most of unsaturated cyclic compounds can be prepared in the presence of a catalytic system (hereinafter referred to as the "catalytic system A") consisting of compounds of tungsten and/or molybdenum and organic aluminium compounds or both forms of compounds and another compound (a third component) or a catalytic system (hereinafter referred to as the "catalytic system B") consisting of oxides of tungsten and Lewis acids or both forms of components and organic aluminium compounds with or without inert organic solvents.

The compounds of tungsten and molybdenum may be typically exemplified by tungsten hexachloride, molybdenum pentachloride, tungsten oxytetrachloride ($WOCl_4$) and aluminiumtungsten halides (for example, $Al_4W_3Cl_{18}$) obtained by reducing tungsten halides with aluminium powders.

Organic aluminium compounds constituting a part of the catalytic system used in the ring-opening polymerization are of the type whose chemical structure may be expressed by the general formula $AlR_3$ or $AlR_nX_{3-n}$ (where R represents the alkyl, aryl radical or aralkyl radical, X denotes halogens, hydrogen or alkoxy radical and $n$ is 1, 1.5 or 2) or $AlR_3 \cdot H_2O$ (where the mol ratio of $H_2O$ to $AlR_3$ has a value of $<1.5$).

Most preferable among the above-listed organic aluminium compounds are triethyl aluminium, triisobutyl aluminium, trihexyl aluminium, diethyl aluminium monochloride, di-n-butyl aluminium monochloride, ethyl aluminium sesquichloride, diethyl aluminium monobutoxide and a mixture of triethyl aluminium and water in which the triethyl aluminium and water bear the mole ratio of 1:0.5.

Other catalytic compounds than those of tungsten, molybdenum and organic aluminium are set forth in the Japanese Patent Application Nos. 31755/72 and 108902/72.

The mole ratio of organic aluminium compounds to the compounds of tungsten or molybdenum is generally more than 0.1, preferably more than 0.5. Use of less than 0.1 mol of organic aluminium compounds based on 1 mol of compounds of tungsten or molybdenum failed to attain practical polymerization activity. A catalytic system consisting of 10 mols of organic aluminium compounds based on 1 mol of compounds of tungsten or molybdenum realized an extremely high degree of polymerization activity.

A third component whose proportion varies with the kind should preferably be used in an amount of 10 mols at most or usually 5 mols at most per mol of the compound of tungsten or molybdenum. The reason is that any larger application of said third component than 10 mols will not attain the elevation of the polymerization activity of the resultant catalytic system.

While the amount of the subject catalytic system added to the monomer of the norbornene derivatives varies with the type of said monomer, etc. the compounds of tungsten or molybdenum should generally be added at the rate of 0.001 to 20 mols, or preferably 0.1 to 5 mols based on 100 mols of said monomer. Addition of more than 20 mols of the compounds of tungsten or molybdenum based on 100 mols of said monomer not only results in high cost but also fails to promote the catalytic action, namely, such excess addition does not elevate the polymerization activity. Further, if unduly large amounts of said compounds of tungsten or molybdenum are used, the reaction system will contain such amounts of residual tungsten or molybdenum compounds as will be difficult to eliminate after completion of the ring-opening polymerization. The presence of said catalytic component in the polymer obtained will undesirably color the polymer. Said coloration increases the tint of the polymer in the subsequent operation of molding the polymer or causes the thermal deterioration of the resultant product.

The ring-opening polymerization is carried out generally at a temperature ranging from $-100°$ C to $+200°$ C or more preferably from $-40°$ C to $+150°$ C or most preferably from room temperature to $+100°$ C. At a lower temperature than $-100°$ C, the reaction system does not display desirable polymerization activity with the resultant extremely slow progress of polymerization. In such case, progress of the polymerization consumes a great deal of time, furthermore, sometimes causing a mixture of the inert organic solvent and monomer to be solidified. Conversely, a higher temperature than $200°$ C fails to provide a good quality of polymer prepared by ring-opening polymerization, and is practically undesirable.

The third component used in forming the catalytic system (A) includes water, hydrogen peroxide, oxygen-bearing organic compounds (for example, alkyl peroxides, epoxides, acetal compounds, alcoholic compounds, carboxylic acids or anhydrides thereof, carboxylic acid esters and ketones), nitrogen-bearing organic compounds (for example, amines, nitrogen-bearing heterocyclic compounds and acid amides), halogen-bearing organic compounds (for example, halogenated aromatic hydrocarbons, tertiary hypoharites and halogenated alcoholic compounds), phosphorus-bearing organic compounds (for example, phosphine compounds, phosphine oxides, phosphites and phosphates), sulfur-bearing organic compounds (for example, sulfides, sulfoxides and sulfones), and metal-bearing organic compounds (for example, metal salts of saturated monovalent carboxylic acid having 30 carbon atoms at most, saturated carboxylic acid having 30 carbon atoms at most and containing a cycloalkyl radical or substituted cycloalkyl radical or carboxylic acid having 30 carbon atoms at most and containing a phenyl radical or substituted phenyl radical).

The other kinds of compounds of tungsten and molybdenum, organic aluminium compounds and third catalytic components, the typical examples thereof and the ratio in which said three components are applied, and the proportions of the respective components based on the monomer used in the ring-opening polymerization are indicated in the Japanese Patent Application No. 31755/72.

The ring-opening polymerization product applied in the method of this invention can be prepared in the presence of a catalytic system consisting of compounds of tungsten and/or molybdenum and organic aluminium compounds or both types of compounds and a third component by carrying out the ring-opening polymerization at a temperature ranging from $-100°$ C to $+200°$ C with or without the aforesaid inert organic solvent. Further, the ring-opening polymerization product used in this invention can be prepared in the presence of another catalytic system formed of oxides of tungsten and/or molybdenum (hereinafter referred to as "oxides"), for example, tungsten trioxide, molybdenum trioxide and the Lewis acids, or said oxides, Lewis acids and organic aluminium compounds at the temperature ranging from $-50°$ C to $+150°$ C with or without the inert organic solvent.

The Lewis acids used as a catalytic component may be typically exemplified by such as aluminium chloride, tin tetrachloride, vanadium tetrachloride and halogen atom-bearing organic aluminium compounds such as dialkyl aluminium chloride and alkyl aluminium dichloride.

Where the ring-opening polymerization product is prepared, said Lewis acids are generally used in an amount of 0.1 to 10.0 mols, more preferably 0.3 to 5.0 mols per mol of above-mentioned oxides and further where the catalytic system contains an organic aluminium compound, said aluminium compound is generally applied in an amount of 10.0 mols at most, more preferably 5.0 mols at most per mol of said oxides.

Further, the ring-opening polymerization product may be prepared by directly charging the oxides and Lewis acids, or the oxides, Lewis acids and organic aluminium compounds into a polymerization apparatus or by charging said apparatus with a product resulting from the beforehand reaction between the oxides and Lewis acids, or a powder prepared by jointly pulverizing the oxides and Lewis acids, or a mixture of said beforehand prepared reaction product or said powder and organic aluminium compounds.

Reaction between the oxides and Lewis acids can be effected at temperatures ranging from room temperature to $200°$ C with or without the inert organic solvent, with the proportion of the Lewis acids set at 0.1 to 10.0 mols, 0.3 to 5.0 mols per mol of the oxides.

The components of these catalytic systems (A), (B) may be added to a reaction system without pretreatment. Or it is possible to subject said components to pretreatment by pulverizing or copulverizing some or all of the respective catalytic components, carry out the heating or reaction of said components or extract the heated or pulverized or copulverized catalytic components or reaction products thereof by a solvent and thereafter add the components thus treated to a reaction (ring-opening polymerization) system.

The object of the ring-opening polymerization can be fully attained, as previously described, by the ring-opening polymerization of norbornene derivatives or a mixture of said derivatives and unsaturated cyclic compounds in the presence of a catalytic system (A) or (B) with or without an inert organic solvent. Yet, the molecular weight of the resultant polymer can be controlled by adding to the polymerization system α-olefins (preferably α-olefines having 2 to 12 carbon atoms) such as ethylene, propylene, butene-1 and hexene-1; internal olefins such as butene-2 and hexene-2; conjugated diolefins such as butadiene and isoprene or nonconjugated diolefins such as 1,4-hexadiene (preferably conjugated and nonconjugated diolefins having 4 to 10 carbon atoms). In this case, it is generally recommended to add 10 parts by weight at most of said molecular weight controlling agent based on 100 parts by weight of the monomer.

As previously mentioned, the polymer can be obtained by the ring-opening polymerization of the subject monomer in the presence of an inert organic solvent or in the absence of said solvent (bulk polymerization). Said inert organic solvent is preferred to be the type which does not harmfully affect the catalytic system and has a boiling point of 0° to 250° C, more preferably 25° to 200° C. Typical of said solvents are aliphatic hydrocarbons such as pentane, heptane, hexane, petroleum ether and decane; aromatic hydrocarbons such as benzene, toluene and xylene; alicyclic hydrocarbons such as cyclohexane, decaline and cyclooctane; halogenated hydrocarbons such as methylene chloride; 1,2-dichloroethane, 1,1-dichloroethane, 1,2-dichloropropane, chloroform, chlorobenzene; and ethers such as diethyl ether and tetrahydrofuran.

The ring-opening polymerization products used in this invention should be purified (subjected to after-treatment) as the ring-opening polymerization products prepared by the processes set forth in the Japanese Patent Applications Nos. 31755/72, 108902/72, 119785/72, 119968/72 and 123329/72 are purified.

The processes of preparing the ring-opening polymerization products applied in the method of this invention are described in the above-mentioned patent applications.

For preparation of the composition of this invention, the aforesaid ring-opening polymerization homopolymer or copolymer may be used as the previously defined A component, alone or in combination with a resinous material (containing graft copolymers) and/or rubber-like material.

While said ring-opening polymerization homopolymer or copolymer may be mixed in advance with one or more kind of resinous and/or rubber-like (elastic) material, it is possible to carry out said mixing simultaneously with addition of stabilizers of phenolic compounds, thioethers of carboxylic acid esters and phosphite compounds or to blend the first-mentioned mixture with any of the above-mentioned group of stabilizers and thereafter with the remaining stabilizers.

Resinous material used as a component of the component A of the composition of this invention denotes vinyl chloride polymers, styrene homopolymer, methylmethacrylate homopolymer, copolymers prepared by copolymerizing any combination of vinyl monomers selected from the group consisting of styrene, acrylonitrile and methylmethacrylate, other forms of copolymer prepared by copolymerizing at least 50% by weight of any of said vinyl monomers and another monomer, and graft copolymers. The term "vinyl chloride polymers", as used in this invention, denotes homopolymers prepared by polymerizing vinyl chloride alone, and copolymers prepared by copolymerizing more than 50 mol% of vinyl chloride with less than 50 mol% of at least one monomer such as vinyl acetate, vinylidene chloride, ethylene, propylene, acrylonitrile and maleic acid. These homopolymers and copolymers of vinyl chloride (namely, vinyl chloride polymers) are widely manufactured on an industrial scale by emulsion-, suspension- or bulk-polymerization. Preferred for the object of this invention is a vinyl chloride polymer having a polymerization degree of 350 to 1800, preferably 450 to 1500, suitably 600 to 1300.

The above-mentioned vinyl chloride polymer which is unstable to heat and light is likely to give rise to partial deterioration during the mixing process and consequently should advisably be mixed with a stabilizer (or dehydrochlorination inhibitor) such as metal soap, tin compounds and compounds containing epoxy radical.

The styrene homopolymer, methylmethacrylate homopolymer and above-mentioned copolymers can be prepared by the bulk-, solution-, emulsion- or suspension-polymerization or a combination thereof, using a catalytic system consisting of free-radical initiator such as organic peroxides or other compounds. The copolymers include acrylonitrile-styrene copolymer, methylmethacrylate-styrene copolymer, copolymers of methylmethacrylate as a main component and another monomer (referred to as "methylmethacrylate resin"), acrylonitrile-styrene-methylmethacrylate terpolymer, and copolymers mainly consisting of styrene or acrylonitrile. A most of the homopolymers of styrene and methylmethacrylate and various copolymers are widely manufactured on an industrial scale and applied in broad fields [for the manufacturing process, properties and use, refer to "Plastics Handbook" by Murahashi, Oda and Imoto, published by Asakura Publishing Company and to "Encyclopedia of Polymer Science and Technology (Plastics, resins, rubbers, fibers)" by Herman F. Mark et al, vols. 1 to 16 (1964 - 1971) published by John Wiley & Sons, Inc.].

As used in this invention, the above-mentioned resinous material is preferably chosen to have a molecular weight of 3000 to 500000, more preferably 5000 to 200000, though said molecular weight may vary with the kind, thermal and mechanical properties and moldability of said resinous material.

The graft copolymers used as a component of the composition of this invention are prepared by grafting at least one vinyl compound selected from the group consisting of styrene, acrylonitrile and methylmethacrylate to the later described rubber-like material. Said grafting may be effected by the bulk-, emulsion-, suspension- or solution-polymerization or a combination thereof (for example, bulk-suspension polymerization).

The above-mentioned graft copolymers are desired to contain 1 to 85% by weight of rubber-like material and 99 to 15% by weight of vinyl compounds, or preferably 2 to 80% by weight of rubber-like material and 98 to 20% by weight of vinyl compounds.

The graft copolymers obtained by the above-mentioned graft polymerizing processes include methylmethacrylate-butadiene-styrene terpolymer (MBS resin) prepared by grafting styrene and methylmethacrylate to butadiene rubber or styrene-butadiene rubber, acrylonitrile-butadiene-styrene terpolymer (ABS resin) prepared by grafting styrene and acrylonitrile to butadiene rubber, acrylonitrile-butadiene rubber or styrene-butadiene rubber, acrylonitrile-chlorinated polyethylene-styrene terpolymer (ACS resin) prepared by grafting acrylonitrile and styrene to chlorinated polyethylene rubber, methylmethacrylate-chlorinated polyethylene-styrene terpolymer (MCS resin) prepared by grafting methylmethacrylate and styrene to chlorinated polyethylene rubber, graft copolymer (AEVS resin) prepared by grafting styrene and acrylonitrile to ethylene-vinyl acetate rubber, and graft copolymer (AAS resin) prepared by grafting styrene and acrylonitrile to acrylic ester rubber. For the object of this invention, the above-listed graft copolymers do not always require monomeric vinyl compounds to be fully grafted to the rubber-like material (elastomer). But the graft copolymer may be of the type in which some of the vinyl compound is grafted to the rubber-like material and the other portion of said vinyl compound is polymerized or copolymerized, that is, the grafted material and polymerized vinyl compound are present in said grafted mass in a mixed form. The process of manufacturing these graft copolymers is already widely known. Some of said graft copolymers are manufactured on an industrial scale and are often used as a master batch in preparing high impact resin [for the manufacturing process, properties and use, refer to "Plastics Handbook" by Murahashi, Oda and Imoto, published by Asakura Publishing Company and to "Encyclopedia or Polymer Science and Technology (Plastics, resins, rubbers, fibers)" by Herman F. Mark et al, vols. 1 to 16 (1964 - 1971) published by John Wiley & Sons, Inc.]. The rubber-like material used in preparing the graft copolymer applied in the method of this invention may take a gel form. A resinous material grafted to the rubber-like material is preferably chosen to have an average molecular weight of 1000 to 200000 or more preferably 2000 to 100000.

The rubber-like material used as a component of the component A of the composition of this invention includes butadiene rubber, chlorinated polyethylene rubber, acrylic ester rubber, ethylene-vinyl acetate rubber, chloroprene rubber, chlorosulfonated polyethylene rubber and alkylene oxide rubber.

The butadiene type rubber includes butadiene rubber and rubber prepared by copolymerizing butadiene as a main component with a small amount (generally 30% by weight at most, preferably 25% by weight at most) of monomer such as styrene or acrylonitrile.

The rubber prepared by copolymerization may be of the random or block type. The butadiene type rubber is prepared by emulsion polymerization, using a redox catalyst or a free-radical initiator as a catalyst or by solution polymerization, using a catalyst consisting of organic lithium compounds (for example, n-butyllithium).

The chlorinated polyethylene rubber is prepared by chlorinating in a solvent or aqueous suspension ethylene homopolymer having a high density of 0.93 to 0.98 g/cc or a copolymer of ethylene and a small amount (generally less than 10 mol%) of α-olefin such as propylene or butene-1. Said chlorinated polyethylene rubber is preferred to contain 25 to 45% by weight of chlorine.

The acrylic ester rubber is prepared by the emulsion polymerization of a mixture consisting of acrylic acid ester (for example, butyl acrylate) as a main component and a small amount (generally less than 10% by weight) of another monomer (for example, acrylonitrile) in the presence of a catalyst such as persulfate. This rubber is generally referred to as acrylic rubber.

The ethylene-vinyl acetate rubber is prepared by copolymerizing ethylene with vinyl acetate by, for example, the emulsion polymerization process. In this case, the content of the vinyl acetate is preferred to be 20 to 60% by weight, more preferably 30 to 50% by weight based on the rubber.

The chloroprene rubber is prepared by polymerizing a monomer consisting of chloroprene alone or said chloroprene and a small amount of another monomer by the bulk-, solution- or emulsion-polymerization using a catalyst of persulfates, peroxides or azo compounds. This polymerization is generally carried out in the presence of a polymerization-controlling agent such as mercaptans, sulfur and dialkylxanthogen disulfides.

The chlorosulfonated polyethylene rubber is prepared by chlorosulfonating in an organic solvent the homopolymer or copolymer of ethylene used in preparing the aforesaid chlorinated polyethylene rubber. Said chlorosulfonated polyethylene rubber is preferred to contain 20 to 50% by weight, more preferably 24 to 45% by weight of chlorine and 0.3 to 2.0% by weight, more preferably 0.5 to 1.7% by weight of sulfur.

The alkylene oxide rubber is prepared by polymerizing alkylene oxides such as ethylene oxide, propylene oxide and epichlorohydrin or other monomers mainly consisting of derivatives of said oxides in the presence of a catalytic system mainly composed of organic metal compounds (for example, organic aluminium compounds).

The above-mentioned various kinds of rubber-like material are preferably chosen to have a Mooney viscosity of 20 to 140, more preferably 30 to 120, or suitably 40 to 110 though said viscosity may vary with the kinds of said rubber-like material.

These rubber-like materials are widely manufactured on the industrial scale and applied in broad fields, and the manufacturing processes, properties and applications of said materials are well known [refer to "Synthetic Rubbers Handbook" by S. Kanbara et al published by Asakura Publishing Company and to "Encyclopedia of Polymer Science and Technology (Plastics, resins, rubbers, fibers)" by Herman F. Mark et al, vols. 1 to 16 (1964 - 1971) published by John Wiley & Sons, Inc.].

The kinds of the resinous and rubber-like material, as well as the proportions thereof based on the ring-opening polymerization homopolymer or copolymer for the subject composition, can be determined according to the object for which said composition is applied.

One or more kinds of resinous and/or rubber-like material may be used. In the latter case, it is possible to mix said resinous and rubber-like materials in advance and then add the mixture to the homopolymer or copolymer or to mix all these components together in preparing the subject composition.

The proportion of the resinous material is generally chosen to be 75% by weight at most, more preferably 50% by weight or less, most preferably 30% by weight or less based on the mixture of ring-opening polymerization homopolymer or copolymer and resinous materials including grafted mass or the mixture of ring-opening polymerization homopolymer or copolymer, resinous materials and rubber-like materials, though said proportion may vary with the kinds of said resinous material and homopolymer or copolymer and the object for which the resultant composition is intended.

A larger proportion of resinous material than 75% by weight fails to render the resultant compositions prominently resistant to impact.

The content of rubber-like material in the mixture of ring-opening polymerization product, and rubber-like material or the mixture of ring-opening polymerization product, resinous material including grafted mass and rubber-like material is chosen to be 30% by weight at most, preferably 20% by weight at most and most suitably 10% by weight at most (where the subject mixtures contain grafted mass, the proportion of said rubber-like material is calculated on the basis of the amount of the rubber-like material used in preparing said grafted mass). A larger amount of the rubber-like material than 30% by weight undesirably decreases the tensile strength of the resultant composition.

The metal salts used in preparing the compositions of this invention include fatty acid salts of at least one metal selected from the group consisting of lithium, sodium, potassium, copper, beryllium, magnesium, calcium, strontium, barium, zinc, cadmium, aluminium, tin, lead, iron, nickel and cobalt.

The fatty acids include saturated monobasic fatty acids having 6 to 20 carbon atoms, saturated dibasic fatty acids having 6 to 20 carbon atoms, unsaturated fatty acids having 11 to 24 carbon atoms and derivatives thereof.

The saturated monobasic fatty acids include caproic acid, enanthic acid, caprylic acid, pelargonic acid, capric acid, undecanoic acid, lauric acid, myristic acid, palmitic acid, stearic acid and arachic acid.

The saturated dibasic fatty acids include adipic acid, pimelic acid, suberic acid, azelaic acid, sebacic acid, undecane-1,9-dicarboxylic acid, decane-1,10-dicarboxylic acid, dodecane-1,12-dicarboxylic acid, tetradecane-1,14-dicarboxylic acid, hexadecane-1,16-dicarboxylic acid and octadecane-1,18-dicarboxylic acid.

The unsaturated fatty acids include unsaturated monobasic fatty acids such as linderic acid, tsuzuic acid, 5-miristoleic acid, miristoleic acid, 9-palmitoleic acid, petroselinic acid, oleic acid, elaidic acid, gadoleic acid, gomdoic acid, cetoleic acid, erucic acid, brassidic acid, selacholeic acid, linoleic acid, linolenelaidic acid, linolenic acid, eleostearic acid, moroctic acid, parinaric acid, arachidonic acid, clupanodoxic acid, scolidoxic acid and nisixic acid.

The derivatives of the saturated and unsaturated fatty acids include hydroxyfatty acids such as 2,10-dihydroxytridecanoic acid, 3,11-dihydroxy-tetradecanoic acid, 11-hydroxy-pentadecanoic acid, 2,15-dihydroxy-pentadecanoic acid, 15,16-dihydroxy-hexadecanoic acid, 2,15,16-trihydroxyhexadecanoic acid, 8,9,16-trihydroxy-hexadecanoic acid, 9,10,16-trihydroxyhexadecanoic acid, tetrahydroxy-hexadecanoic acid, 16-hydroxy-$\Delta^9$, $^{10}$-hexadecanoic acid, 9,10-dihydroxy-octadecanoic acid, 12-hydroxy-9,10-stearolic acid, 2-hydroxy-dodecanoic acid, 2-hydroxy-tetradecanoic acid, ricinoleic acid, and 2-hydroxy-hexadecanoic acid; and halogenated fatty acids such as chlorostearic acid, 2-bromocaproic acid, 6-bromocaproic acid, 2-bromoenanthic acid, 7-bromoenanthic acid, 2-bromocaprylic acid, 8-bromocaprylic acid, 2-bromopelargonic acid, 9-bromopelargonic acid, 2-bromocapric acid, 10-bromocapric acid, 2-bromoundecanoic acid, 11-bromoundecanoic acid, 2-bromolauric acid, 12-bromolauric acid, 2-bromomyristic acid, 14-bromomyristic acid, 2-bromopalmitic acid, 16-bromopalmitic acid, 2-bromostearic acid, 18-bromostearic acid, 2-bromoarachic acid, and 20-bromoarachic acid.

Desired among the saturated fatty acids are those, particularly monobasic acids, which contain 8 to 20 carbon atoms. Most suitable among the preferred monobasic acids are those which contain 8 to 18 carbon atoms. Preferred among the unsaturated fatty acids are those which contain 11 to 18 carbon atoms. Preferred among the metals forming salts with the fatty acids are lithium, sodium, magnesium, calcium, strontium, barium, cadmium and lead.

The metal salts of fatty acids used in the method of this invention which include metal salts of saturated fatty acids having 6 to 20 carbon atoms, unsaturated fatty acids having 11 to 24 carbon atoms derivatives thereof may be typically exemplified by sodium caproate, calcium caproate, sodium caprylate, magnesium caprylate, calcium caprylate, calcium caprate, calcium undecanoate, sodium laurate, magnesium laurate, calcium laurate, strontium laurate, barium laurate, zinc laurate, cadmium laurate, aluminium laurate, lead laurate, calcium myristate, calcium palmitate, zinc palmitate, lithium stearate, sodium stearate, potassium stearate, copper stearate, beryllium stearate, magnesium stearate, calcium stearate, strontium stearate, barium stearate, zinc stearate, cadmium stearate, aluminium stearate, lead stearate, ferrous stearate, nickel stearate, cobalt stearate, cobalt arachate, sodium oleate, potassium oleate, cupric oleate, magnesium oleate, calcium oleate, barium oleate, zinc oleate, cadmium oleate, aluminium oleate, stannous oleate, lead oleate, ferrous oleate, nickel oleate, cobalt oleate, calcium 2-ethyl hexoate, barium 2-ethyl hexoate, cadmium 2-ethyl hexoate, zinc 2-ethyl hexoate, lead 2-ethyl hexoate, cadmium octylate, sodium azelate, potassium azelate, sodium sebacate, calcium linoleate, barium linoleate, cobalt linoleate, lithium 12-hydroxystearate, calcium 12-hydroxystearate, barium 12-hydroxystearate, zinc 12-hydroxystearate, cadmium 12-hydroxystearate, aluminum 12-hydroxy-distearate, lead (II) 12-hydroxystearate, calcium ricinolate, barium ricinolate, zinc ricinolate, cadmium ricinolate, calcium chlorostearate, barium chlorostearate, cadmium chlorostearate, calcium 2-bromostearate, and calcium 18-bromostearate.

Preferred among the metal salts of fatty acids are lithium stearate, sodium stearate, magnesium stearate, calcium stearate, strontium stearate, barium stearate, cadmium stearate, lead stearate, calcium laurate, barium laurate, cadmium laurate, calcium 2-ethyl hexoate, barium 2-ethyl hexoate, cadmium 2-ethyl hexoate, cadmium octylate, calcium ricinolate, barium ricinolate, and cadmium ricinolate. Most suitable among these preferred metal salts of the fatty acids are sodium stearate, magnesium stearate, calcium stearate, barium stearate, lead stearate, calcium laurate, barium laurate, calcium ricinolate, and barium ricinolate. The above-listed metal salts of fatty acids may be used alone or in combination.

For practice of this invention, blending of metal salts of fatty acids with ring-opening polymerization homopolymers, copolymers thereof, or said ring-opening polymerization products mixed with resinous and/or rubber-like materials may be effected by spraying a solution or suspension of said metal salts of fatty acids to the ring-opening polymerization products or said products mixed with resinous and/or rubber-like materials and then volatilizing the solvent contained.

Another process of said blending is first to pulverize the respective components being blended and dry blend said pulverized components in a mixer such as a ribbon blender, rotary cone mixer, rotary mixer or Henschel mixer or to knead said components in a molten state on a mixer such as a hot roll mill, Banbury mixer or extruder. These latter processes are convenient, because they attain homogeneous blending with relative ease. A combination of the spraying process or dry blending process and kneading in a molten state can attain more homogeneous mixing of said components.

With the method of this invention, the proportion of metal salts of fatty acids is chosen to be 0.05 to 10.0 parts, preferably 0.5 to 7.0 parts, more suitably 1.0 to 5.0 parts by weight based on 100 parts by weight of the ring-opening polymerization products or said products blended with resinous and/or rubber-like materials. A smaller proportion of said metal salts of fatty acid than 0.05 part by weight fails to elevate the impact strength of the resultant composition. On the other hand, a larger proportion of said metal salts of fatty acid than 10.0 parts by weight is not preferred, because such excess proportion is not only unadapted to increase the impact strength of said composition, but also decreases the mechanical properties thereof such as tensile strength. Where the composition of this invention is used as a master batch, it is obviously advised to control the proportion of the metal salts of fatty acid based on the finally obtained composition so as to fall within the above-mentioned range.

As mentioned above, the composition of this invention is prominently improved in not only impact strength but also workability, and has an excellent surface appearance. In contrast, the conventional composition blended with general rubber-like material increases in impact strength but decreases in workability and mechanical properties such as tensile strength.

The subject composition possessed of excellent properties can fully serve the purpose by itself. Depending on the object of application, however, the composition may be blended with additives such as stabilizers to light (ultraviolet rays), heat, oxygen and ozone, flame retardants, plasticizers, lubricants, colorants, antistatic agents, foaming agents, etc. which are astomarily used in the field of synethetic resins.

The composition of this invention or said composition blended with the above-mentioned additives can be formed due to prominent workability into films, sheets, boards, rods, pipes, balls, containers and many other shaped articles, for example, by the injection-, compression-, extrusion- or blow-molding. Concrete articles prepared from the composition of this invention may be exemplified by containers, running water pipes, parts of electrical appliances (including lighting implements), mechanical parts, window frames, kitchen utensils, toys and other daily necessaries and sundry goods.

This invention will be more fully understood by reference to the examples which follow. Throughout the examples and controls, the Izod impact strength was determined according to ASTM D-256-56. The tensile strength was measured according to the Japanese Industrial Standards (hereinafter abbreviated as JIS) K6723 (in this test, a test piece JIS No. 2 1/2 1 mm thick was used and tensile speed was 5 mm/min.). The Vicat softening point was defined according to ASTM D-1525-58T. Fluidity was determined by a Koka type flow tester under a load of 300 kg and at a temperature of 200° C, using a nozzle having L/D of 10/1. The pencil hardness was measured according to JIS K5401.

EXAMPLE 1, Control 1

A fully dried and nitrogen-purged 20l stainless steel autoclave was charged (followed by thorough stirring) with 3.0 kg of a 5-cyano-bicyclo[2,2,1]-heptenen-2 (containing 40% of exo type isomer) as a monomer distilled for purification by a precision distillation device immediately before application, 9l of 1,2-dichloroethane as a solvent dehydrated by calcium hydride immediately before application and 30.6 ml (0.98 mol% based on the monomer) of n-hexene-1 as a molecular weight-controlling agent. Added to this mixed solution were 75.6 ml of 1,2-dichloroethane solution of tungsten hexachloride (0.2 mol/l) as a polymerization catalyst, 90.8 ml of 1,2-dichloroethane solution of diethyl aluminium chloride (1.0 mol/l) as a polymerization catalyst and 75.6 ml of 1,2-dichloroethane solution of 1,1-diethoxyethane[$CH_3CH(OC_2H_5)_2$](0.6 mol/l) as a third component. (Based on 1 mol of the monomer, the proportion of the tungsten hexachloride was 0.6 millimol, the proportion of the diethyl aluminium chloride was 3.6 millimols and the proportion of the 1,1-diethoxyethane was 1.8 millimols.) Polymerization was continued 2 hours at 70° C. Upon completion of polymerization, a solution containing a reaction product (including a ring-opening polymerization product, residual catalyst, solvent unreacted monomer and molecular weight-controlling agent) was taken out of the autoclave, and allowed to cool. 100 ml of monoethanolamine was added to said solution, followed by full stirring. The mass was poured in a large amount (about 30l) of methylalcohol to precipitate the ring-opening polymerization product obtained. This ring-opening polymerization product was subjected to two disolution-precipitation cycles by an acetone/methylalcohol system. After taken out of the system, the ring-opening polymerization product was dissolved in methylene chloride. The resultant solution was washed three times with a 1% aqueous solution of sodium tripolyphosphate. Then, water washing was carried out three times. The ring-opening polymerization product was diluted with acetone to a concentration of about 10% by weight. The diluted ring-opening polymerization product was precipitated by a large amount of methylalcohol. The precipitated ring-opening polymerization product was taken out and dried 48 hours at temperature of 45° C under vacuum. The ring-opening polymerization product thus treated was a white flaky form, and indicated a reduced viscosity of 0.58 as measured at 30° C in dimethylformamide in which said product was dissolved at a concentration of 0.1 g/dl. This product is hereinafter referred to as a "polymer 1".

100 parts by weight of the purified ring-opening polymerization product (polymer 1) and 0.5 part by weight of 2,2'-methylenebis(4-methyl-6-tert-butylphenol) as a stabilizer were fully kneaded 10 minutes on a hot roll whose surface temperature was set at 180° C. The kneaded mass was formed into a compressed sheet by being compressed 5 minutes at a pressure of 100 kg/cm$^2$ in a press molding machine at 200° C. The compressed sheet obtained indicated an Izod impact strength of 12.0 kg.cm/cm-notched, tensile strength of 462 kg/cm$^2$, Vicat softening point of 134.7° C and a pencil hardness of 2B. The fluidity of the kneaded mass was 3.2 × 10$^{-3}$ ml/second.

100 parts by weight of said ring-opening polymerization product (polymer 1), 0.5 part by weight of 2,2'-methylenebis (4-methyl-6-tert-butylphenol) as a stabilizer and 3.0 parts by weight of calcium stearate as a metal salt of fatty acid were kneaded on a hot roll in the same manner as described above. A compressed sheet molded from the kneaded mass in the above-mentioned manner indicated an Izod impact strength of 130.6 kg.cm/cm-notched, tensile strength of 444 kg/cm$^2$, Vicat softening point of 132.2° C and pencil hardness of 2B. The fluidity of the kneaded mass was 6.2 × 10⁻² ml/second.

EXAMPLES 2 to 26

Kneading was carried out on a hot roll in substantially the same manner as in Example 1, excepting that the calcium stearate used as a metal salt of fatty acid in Example 1 was replaced by 3.0 parts by weight of each of the metal salts of fatty acid listed in Table 1 below. The kneaded samples were press molded as in Example 1. The Izod impact strength, tensile strength and Vicat softening point of the compressed sheets obtained, as well as the fluidity of the kneaded samples are set forth in Table 1 below.

Table 1

| No. of Example | Metal salt of fatty acid | Izod impact strength[1] (kg.cm-notched) | Fluidity (ml/sec.) | Tensile strength (kg/cm²) | Vicat softening point (° C) |
|---|---|---|---|---|---|
| 2 | Lithium stearate | 105.6 | 6.9×10⁻³ | 443 | 132.1 |
| 3 | Sodium stearate | 125.7 | 7.0 " | 442 | 132.4 |
| 4 | Potassium stearate | 129.3 | 7.0 " | 440 | 132.0 |
| 5 | Magnesium stearate | 150.7 | 7.9 " | 465 | 131.2 |
| 6 | Strontium stearate | 125.1 | 6.3 " | 445 | 133.0 |
| 7 | Barium stearate | 145.2 | 6.3 " | 449 | 132.7 |
| 8 | Zinc stearate | 15.0 | 3.2 " | 425 | 126.5 |
| 9 | Cadmium stearate | 17.5 | 7.3 " | 438 | 132.4 |
| 10 | Aluminium stearate | 15.0 | 7.7 " | 424 | 131.5 |
| 11 | Cupric stearate | 30.0 | 7.5 " | 435 | 131.6 |
| 12 | Lead stearate | 152.9 | 7.2 " | 466 | 127.0 |
| 13 | Ferrous stearate | 46.1 | 6.5 " | 440 | 132.6 |
| 14 | Nickel stearate | 21.6 | 9.6 " | 410 | 125.6 |
| 15 | Cobalt stearate | 30.5 | 6.0 " | 450 | 132.9 |
| 16 | Sodium oleate | 128.9 | 7.1 " | 440 | 132.2 |
| 17 | Calcium linolate | 120.6 | 6.5 " | 445 | 132.1 |
| 18 | Barium ricinolate | 137.1 | 6.2 " | 447 | 132.6 |
| 19 | Barium chlorostearate | 130.1 | 6.0 " | 443 | 132.7 |
| 20 | Barium 2-ethylhexylate | 120.0 | 5.9 " | 441 | 133.3 |
| 21 | Magnesium laurate | 132.0 | 8.0 " | 458 | 132.2 |
| 22 | Calcium laurate | 135.1 | 6.2 " | 444 | 132.6 |
| 23 | Barium laurate | 146.9 | 4.4 " | 453 | 133.7 |
| 24 | Barium caprylate | 110.0 | 4.3 " | 462 | 134.0 |
| 25 | Beryllium stearate | 111.0 | 6.4 " | 446 | 133.0 |
| 26 | Stannous stearate | 25.4 | 8.0 " | 425 | 131.8 |

[1] 1.5 parts by weight were added

EXAMPLES 27 to 30, CONTROL 2

Kneading was carried out on a hot roll in a substantially the same manner as in Exmaple 1, excepting that the proportion of calcium stearate used as a metal salt of fatty acid in Example 1 was changed to 0.5, 1.0, 2.0, 6.0 and 15.0 parts by weight. The Izod impact strength, tensile strength and Vicat softening point of the compressed sheets obtained in the same manner as in Example 1, as well as the fluidity of the kneaded samples are shown in Table 2 below.

Table 2

| No. of Example and Control | Proportion of calcium stearate (parts by weight) | Izod impact strength (kg.cm/cm-notched) | Fluidity (ml/second) | Vicat softening point(° C) | Tensile strength (kg/cm²) |
|---|---|---|---|---|---|
| Example 27 | 1.0 | 50.3 | 4.0×10⁻³ | 133.1 | 451 |
| 28 | 2.0 | 138.7 | 5.2×10⁻³ | 132.9 | 447 |
| 29 | 6.0 | 112.6 | 10.7×10⁻³ | 130.3 | 425 |
| 30 | 0.5 | 17.4 | 3.8×10⁻³ | 134.5 | 463 |
| Control 2 | 15.0 | 25.2 | 19.0×10⁻³ | 115.0 | 395 |

Table 2 above shows that a composition consisting of 100 parts by weight of ring-opening polymerization product blended with 15.0 parts by weight of calcium stearate sharply dropped in the Vicat softening point and tensile strength and also not particularly increased in the Izod impact strength.

EXAMPLE 31, CONTROL 3

The same type of autoclave as used in Example 1 was charged (followed by thorough stirring) with 3.0 kg of 5-methyl-5-methoxycarbonyl-bicyclo[2,2,1]-heptene-2 as a monomer distilled for purification at vacuum by a precision distillation device immediately before application, 9l of 1,2-dichloroethane as a solvent dehydrated by calcium hydride immediately before application and 22.4 ml (1.0 mol% based on the monomer) of n-hexane-1 as a molecular weight controlling agent. Added to this mixed solution were 68.7 ml of 1,2-dichloroethane solution of tungsten hexachloride (0.2 mol/l) as a polymerization catalyst, 68.7 ml of 1,2-dichloroethane solution of diethyl aluminum chloride (1.2 mol/l) as a polymerization catalyst and 68.7 ml of 1,2-dichloroethane solution of 1,1-diethoxyethane (0.6 mol/l) as a third component. (In said mixed solution, the proportion of the tungsten hexachloride was 0.76 millimol based on the monomer, the proportion of the diethyl aluminium chloride was 3 mols per mol of the tungsten hexachloride and the proportion of the 1,1-diethoxyethane was 6 mols per mol of the tungsten hexachloride.) Ring-opening polymerization was continued 3 hours at 45° to 50° C. Upon completion of polymerization, purification (aftertreatment) was carried out in the same manner as in Example 1.

The resultant ring-opening polymerization product presented a faintly yellow transparent form and indicated a conversion of 85.0% and a reduced viscosity of 0.74 as measured in 1,2-dichloroethane at 30° C in which said product was dissolved at a concentration of 0.1 g/dl. This product is hereinafter referred to as a "polymer 2".

100 parts by weight of the purified ring-opening polymerization product (polymer 2) and 0.5 part by weight of 2,2'-methylenebis(4-methyl-6-tert-butylphenol) as a stabilizer were fully kneaded 10 minutes on a hot roll whose surface temperature was set at 170° C. A compressed sheet prepared from the kneaded mass by being compressed 5 minutes at a pressure of 100 kg/cm² in a hot press at 200° C indicated an Izod impact strength of 8.2 kg·cm/cm-notched, tensile strength of 390 kg/cm², Vicat softening point of 87.0° C and pencil hardness of 5B. The fluidity of the kneaded mass was 25.4 × 10⁻³ ml/second as measured at 200° C and under a load of 100 kg.

100 parts by weight of said ring-opening polymerization product (polymer 2), 0.5 part by weight of 2,2'-methylenebis (4-methyl-6-tert-butylphenol) as a stabilizer and 3.0 parts by weight of calcium stearate as a metal salt of fatty acid were kneaded on a hot roll in the same manner as described above. A compressed sheet prepared from the kneaded mass in the above-mentioned manner indicated an Izod impact strength of 102.8 kg·cm/cm-notched, tensile strength of 380 kg/cm², Vicat softening point of 85.0° C and pencil hardness of 5B. The fluidity of the kneaded mass was 32.4 × 10⁻³ ml/second as measured at 200° C and under a load of 100 kg.

EXAMPLES 32 to 37, Controls 4 to 9

A fully dried and nitrogen-purged autoclave of the same type as used in Example 1 was charged (followed by thorough stirring) with 11.4l in 1,2-dichloroethane as a solvent dehydrated by calcium hydride immediately before application, 2.88 kg (20 mols; monomer concentration of 20 wt/vol%) of 5,5-dicyano-bicyclo[2,2,1]-heptene-2 as a monomer distilled for purification at vacuum by a precision distillation device immediately before application and 24.8 mP (1 mol% based on the monomer) of n-hexene-1 as a molecular weight controlling agent. Added to the charged mass were 100 ml (0.1 mol% based on the monomer) of 1,2-dichloroethane solution of tungsten hexachloride (0.2 mol/l) as a polymerization catalytic component, 100 ml (3 mols per mol of the tungsten hexachloride) of 1,2-dichloroethane solution of 1,1-diethoxyethane (0.6 mol/l) as a third component and 120 ml (6 mols per mol of the tungsten hexachloride) of 1,2-dichloroethane solution of diethyl aluminium chloride (1.0 mol/l) as a catalytic component. Polymerization was continued 5 hours at 70° C. Upon completion of polymerization, purification (aftertreatment) was carried out in the same manner as in Example 1. The ring-opening polymerization product purified had a weight of 2.07 kg, presented a white powdery form, and indicated conversion of 73.0% and a reduced viscosity of 0.52 as measured in dimethylformamide at 30° C in which said product was dissolved at a concentration of 0.1 g/dl. This product is hereinafter referred to as a "polymer 3".

After dried and purged with nitrogen, the autoclave used in Example 1 was charged (followed by stirring for homogeneous mixing) with 8.0l of 1,2-dichloroethane as a solvent dehydrated by calcium hydride immediately before application, 2.66 kg (20 mols; monomer concentration of 25 wt/vol%) of 5-cyanomethyl-bicyclo[2,2,1]-heptene-2 as a monomer distilled for purification at vacuum by a precision distillation device immediately before application and 17.3 ml (0.7 mol%) based on the monomer) of n-hexene-1 as a molecular weight-controlling agent. Added to the charged mass were 70 ml (0.08 mol% based on the monomer) of 1,2-dichloroethane solution of tungsten hexachloride (0.2 mol/l) as a polymerization catalytic component, 70 ml (3 mols per mol of the tungsten hexachloride) of 1,2-dichloroethane solution of 1,1-diethoxyethane (0.6 mol/l) as a third component and 84 ml (6 mols per mol of the tungsten hexachloride) of 1,2-dichloroethane solution of diethyl aluminum chloride (1.0 mol%/l) as a catalytic component. Polymerization was continued 3 hours at 70° C. after treatment was carried out in the same manner as in Example 1. The ring-opening polymerization product obtained had a weight of 2.18 kg, presented a white powdery form, and indicated a conversion of 82% and a reduced viscosity of 0.68 as measured in dimethylformamide at 30° C in which said product was dissolved at a concentration of 0.1 g/dl. This polymer is hereinafter referred to as a "polymer 4".

After fully dried and purged with nitrogen, the autoclave used in Example 1 was charged (followed by stirring for homogeneous mixing) with 8.0l of 1,2-dichloroethane as a solvent dehydrated by calcium hydride immediately before application, 2.66 kg (20 mols; monomer concentration of 25 wt/vol%) of 5-cyano-5-methyl-bicyclo[2,2,1]-heptene-2 as a monomer distilled for purification at vacuum by a precision distillation device immediately before application and 17.3 ml (0.7 mol% based on the monomer) of n-hexene-1 as a molecular weight-controlling agent. Added to the charged mass were 80 ml (0.08 mol% based on the monomer) of 1,2-dichloroethane solution of tungsten hexachloride (0.2 mol/l) as a polymerization catalytic component, 80 ml (3 mols per mol of the tungsten hexachloride) of 1,2-dichloroethane solution of 1,1-diethoxyethane (0.6 mol/l) as a third component and 96 ml (6 mols per mol of the tungsten hexachloride) of 1,2-dichloroethane solution of diethyl aluminium chloride (1.0 mol/l) as a polymerization catalytic component. Polymerization was continued 4 hours at 70° C. Upon completion of polymerization, aftertreatment was effected in the same manner as in Example 1. The ring-opening polymerization product obtained had a weight of 3.04 kg, assumed a white powdery form and indicated a reduced viscosity of 0.65 as measured in dimethylformamide at 30° C in which said product was dissolved at a concentration of 0.1 g/dl. This product is hereinafter referred to as a "polymer 5".

After fully dried and purged with nitrogen, the autoclave used in Example 1 was charged (followed by stirring) with 11.4l of 1,2-dichloroethane as a solvent dehydrated by calcium hydride immediately before application, 2.88 kg (20 mols; monomer concentration of 20 wt/vol%) of 5,6-dicyanobicyclo[2,2,1]-heptane-2 as a monomer distilled for purification at vacuum by a precision distillation device immediately before application and 24.8 ml (1 mol% based on the monomer) of n-hexene-1 as a molecular weight-controlling agent. Added to the charged mass were 100 ml (0.1 mol% based on the monomer) of 1,2-dichlorethane solution of tungsten hexachloride (0.2 mol/l) as a polymerization catalytic component, 100 ml (3 mols per mol of the tungsten hexachloride) of 1,2-dichloroethane solution of 1,1-diethoxyethane (0.6 mol/l) as a third component and 120 ml (6 mols per mol of the tungsten hexachloride) of 1,2-dichloroethane solution of diethyl aluminium chloride (1.0 mol/l) as a polymerization catalytic component. Polymerization was continued 5 hours at 70° C. A ring-opening polymerization product purified in the same manner as in Example 1 had a weight of 2.13 kg, presented a white powdery form, and indicated a conversion of 74.5% and a reduced viscosity of 0.53 as measured in dimethylformamide at 30° C in which the product was dissolved at a concentration of 0.1 g/dl. This product is hereinafter referred to as a "polymer 6".

After fully dried and purged with nitrogen, the autoclave used in Example 1 was charged (followed by stirring for homogeneous mixing) with 12.0 l of 1,2-dichloroethane as a solvent purified in the same manner as in Example 1, 3.34 kg (28 mols) of 5-cyano-bicyclo[2,2,1]-heptene-2 as a monomer purified in the same manner as in Example 1, 0.82 kg (12 mols) of cyclopentene also as a monomer precisely distilled for purification and 34.6 ml (0.7 mol% based on the total monomer) of n-hexene-1 as a molecular weight controlling agent. Added to the charged mass were 120 ml (0.06 mol% based on the total monomer) of 1,2-dichloroethane solution of tungsten hexachloride (0.2 mol/l) as a polymerization catalytic component, 120 ml (3 mols per mol of the tungsten hexachloride) of 1,2-dichloroethane solution of 1,1-diethoxyethane (0.6 mol/l) as a third component, and 144 ml (6 mols per mol of the tungsten hexachloride) of 1,2-dichloroethane solution of diethyl aluminium chloride (1.0 mol/l). Polymerization was continued 4 hours at 70° C. Upon completion of polymerization, aftertreatment was carried out in the same manner as in Example 1. The product obtained had a weight of 3.04 kg and presented a white powdery form, and, upon element analysis, was formed to be a copolymer containing 67 mol% of 5-cyano-bicyclo[2,2,1]-heptene-2. Said copolymer indicated a reduced viscosity of 0.62, as measured in 1,2-dichloroethane at 30° C in which said copolymer was dissolved at a concentration of 0.1 g/dl. This product is hereinafter referred to as a "polymer 7".

After fully dried and purged with nitrogen, the autoclave used in Example 1 was charged (followed by stirring for homogeneous mixing) with 8.0 l of 1,2-dichloroethane as a solvent purified in the same manner as in Example 1, 1.67 kg (14 mols) of 5-cyano-bicyclo[2,2,1]-heptene-2 as a monomer purified in the same manner as in Example 1, 1.00 kg (6 mols) of 5-methyl-5-methoxycarbonyl bicyclo[2,2,1]-heptene-2 also as a monomer purified in the same manner as in Example 31 and 14.8 ml (0.6 mol% based on the total monomer) of n-hexene-1 as a molecular weight-controlling agent. Added to the charged mass were 75 ml (0.075 mol% based on the total monomer) of 1,2-dichloroethane solution of tungsten hexachloride as a polymerization catalytic component, 75 ml (3 mols per mol of the tungsten hexachloride) of 1,2-dichloroethane solution of 1,1-diethoxyethane (0.6 mol/l) as a third component and 90 ml (6 mols per mol of the tungsten hexachloride) of 1,2-dichloroethane solution of diethyl aluminium chloride (1.0 mol/l) also as a polymerization catalytic component. Polymerization was continued 3 hours at 70° C. Upon completion of polymerization, aftertreatment was carried out in the same manner as in Example 1. The product obtained had a weight of 2.23 kg, presented a white powdery form, and, upon element analysis, was found to be a copolymer containing 74 mol% of 5-cyano-bicyclo[2,2,1]-heptene-2. The product indicated a reduced viscosity of 0.72 as measured in dimethylformamide at 30° C in which the product was dissolved at a concentration of 0.1 g/dl. This product is hereinafter referred to as a "polymer 8".

100 parts by weight of each of the polymers 3 to 8 and 0.5 part of 2,2'-methylenebis(4-methyl-6-tert-butylphenol) as a stabilizer were kneaded on a hot roll in the same manner as in Example 1. A compressed sheet was prepared from the kneaded mass by being compressed in a press-molding machine as in Example 1. The Izod impact strength, tensile strength, Vicat softening point and pencil hardness of the compressed sheets obtained as well as the fluidity of the kneaded mass are set forth in Table 3 (Controls 4 to 9) below.

100 parts by weight of each of the polymers 3 to 8, 0.5 part by weight of 2,2'-methylenebis(4-methyl-6-tert-butylphenol) and 3.0 parts by weight of calcium stearate as a metal salt of fatty acid were kneaded on a hot roll in the same manner as described above. A compressed sheets was prepared from the kneaded mass by being compressed in a press-molding machine in the aforesaid manner. The Izod impact strength, tensile strength, Vicat softening point and pencil hardness of the compressed sheets obtained, as well as the fluidity of the kneaded mass are set forth in Table 3 (Examples 32 to 37) below.

Table 3

| No. of Example and Control | Kind of Polymer | Izod impact strength (kg.cm/cm-notched) | Tensile strength (kg/cm²) | Vicat softening point (° C) | Pencil hardness | Fluidity (ml/sec.) |
|---|---|---|---|---|---|---|
| Control 4 | 3 | 11.0 | 490 | 140.0 | 2B | 3.0×10⁻³ |
| Example 32 | 3 | 129.1 | 465 | 138.1 | 2B | 6.0×10⁻³ |
| Control 5 | 4 | 12.9 | 480 | 137.0 | 2B | 3.2×10⁻³ |
| Example 33 | 4 | 130.7 | 462 | 135.4 | 2B | 6.0×10⁻³ |
| Control 6 | 5 | 13.5 | 513 | 144.0 | 2B | 2.5×10⁻³ |
| Example 34 | 5 | 135.6 | 481 | 141.3 | 2B | 5.1×10⁻³ |
| Control 7 | 6 | 11.3 | 502 | 141.2 | 2B | 2.9×10⁻³ |
| Example 35 | 6 | 130.2 | 480 | 139.6 | 2B | 5.5×10⁻³ |
| Control 8 | 7 | 15.0 | 425 | 128.2 | 2B | 4.2×10⁻³ |
| Example 36 | 7 | 126.1 | 401 | 127.5 | 2B | 7.6×10⁻³ |
| Control 9 | 8 | 10.0 | 450 | 116.0 | 3B | 25.1×10⁻³ |
| Example 37 | 8 | 107.2 | 440 | 115.1 | 3B | 31.4×10⁻³ |

EXAMPLES 38 to 40, Controls 10 to 12

75 parts by weight of the ring-opening polymerization product of 5-cyano-bicyclo[2,2,1]-heptane-2 prepared and purified by the same manner as in Example 1, 25 parts by weight of polyvinyl chloride having a polymerization degree of 1100 containing 3% by weight of dibutyltin maleate as a stabilizer (manufactured by Kureha Chemical Industry Co., Ltd. under a trade name "Kureha PVC S901") and 0.5 part by weight of 2,2'-methylenebis(4-methyl-6-tert-butylphenol) as a stabilizer were kneaded in a molten state on a hot roll in the same manner as in Example 1. The kneaded mass is hereinafter referred to as a "composition A".

95 parts by weight of the above-mentioned ring-opening polymerization product of 5-cyano-bicyclo[2,2,1]-heptene-2, 5 parts by weight of acrylonitrile-butadiene rubber having a Mooney viscosity of 75 and containing 28% by weight of acrylonitrile (manufactured by Japan Synthetic Rubber Co., Ltd. under a trade name "Hycar 1043") and 0.5 part by weight of 2,2'-methylenebis(4-methyl-6-tert-butylphenol) as a stabilizer were kneaded in a molten state in the same manner as described above. The kneaded mass is hereinafter referred to as a "composition B".

95 parts by weight of said ring-opening polymerization product of 5-cyano-bicyclo[2,2,1]-heptene-2, 5 parts by weight of methylmethacrylate-butadiene-styrene terpolymer (manufactured by Kanegafuchi Chemical Industry Co., Ltd. under a trade name "Kaneace B-12") and 0.5 part by weight of 2,2'-methylenebis(4-methyl-6-tert-butylphenol) as a stabilizer were kneaded in a molten state in the same manner as described above. The kneaded mass is hereinafter referred to as a "composition C".

100 parts by weight of each of the above-mentioned compositions A, B, C and 3.0 parts by weight of calcium stearate as a metal salt of fatty acid were kneaded on a hot roll in the same manner as in Example 1.

Compressed sheets were prepared from the kneaded samples as well as from said compositions free from calcium stearate as a metal salt of fatty acid (controls hereinafter referred to as "blank samples"). All these board samples were tested for the Izod impact strength, tensile strength, Vicat softening point, and the fluidity of kneaded samples, the results being set forth in Table 4 below.

Table 4

| No. of Example and Control | Kind of composition | Proportion of metal salt of fatty acid (parts by weight) | Izod impact strength (kg.cm/cm-notched) | Tensile strength (kg/cm$^2$) | Vicat softening point (° C) | Fluidity of kneaded mass (ml/sec.) |
|---|---|---|---|---|---|---|
| Example 38 | A | 3.0 | 125.4 | 470 | 124.1 | $6.5 \times 10^{-3}$ |
| Control 10 | A | — | 8.4 | 494 | 126.7 | $3.5 \times 10^{-3}$ |
| Example 39 | B | 3.0 | 136.2 | 421 | 132.1 | $6.3 \times 10^{-3}$ |
| Control 11 | B | — | 25.4 | 430 | 133.2 | $3.2 \times 10^{-3}$ |
| Example 40 | C | 3.0 | 139.6 | 430 | 131.9 | $6.4 \times 10^{-3}$ |
| Control 12 | C | — | 32.8 | 447 | 133.8 | $3.4 \times 10^{-3}$ |

Control 13

Kneading was carried out on a hot roll in substantially the same manner as in Example 1, excepting that the calcium stearate used in Example 1 was replaced by the same amount (3.0 parts by weight) of stearic acid. A compressed board prepared from the kneaded mass by being pressurized in a press-molding machine as in Example 1 indicated an Izod impact strength of 6.7 kg.cm/cm-notched, tensile strength of 492 kg/cm$^2$, Vicat softening point of 127.1° C and pencil hardness of 2B. The fluidity of the kneaded mass was $10.8 \times 10^{-3}$ ml/second.

What we claim is:

1. Compositions having high impact strength comprising (A) 100 parts by weight of at least one ring-opening polymerization product selected from the group consisting of (a) ring-opening polymerization homopolymers of norbornene derivatives containing at least one nitrile group or substituent including a nitrile group, (b) ring-opening polymerization homopolymers of norbornene derivatives containing at least one ester group or substituent including an ester group, (c) ring-opening polymerization copolymers of combination of said norbornene derivatives, and (d) other ring-opening polymerization copolymers of any of said norbornene derivatives and 50 mol% at most of unsaturated cyclic compounds; and (B) 0.05 to 10 parts by weight of metal salts of fatty acids selected from the group consisting of metal salts of saturated mono- and dibasic fatty acids containing 6 to 20 carbon atoms, metal salts of unsaturated fatty acids containing 11 to 24 carbon atoms and hydroxy and halogen derivatives of said metal salts of saturated and unsaturated fatty acids.

2. Compositions according to claim 1 wherein the component (A) is further blended with 50% by weight at most of elastomeric material based on the total weight of the composition.

3. High impact compositions of claim 2 wherein the elastomeric material is selected from the group consisting of butadiene rubber, chlorinated polyethylene rubber, acrylic ester rubber, ethylene-vinyl acetate rubber, chloroprene rubber, chlorosulfonated polyethylene rubber and alkylene oxide rubber.

4. High impact compositions of claim 1 wherein the fatty acids are selected from the group consisting of saturated monobasic fatty acids containing 8 to 20 carbon atoms and hydroxy and halogen derivatives thereof.

5. High impact compositions of claim 4 that comprise 11 to 18 carbon atom monobasic fatty acids.

6. High impact compositions of claim 1 wherein the metals forming said metal salts are selected from the group consisting of lithium, sodium, magnesium, calcium, strontium, barium, cadmium and lead.

7. High impact compositions of claim 1 wherein said metal salt is selected from the group consisting of sodium stearate, magnesium stearate, calcium stearate, barium stearate, lead stearate, calcium laurate, barium laurate, calcium ricinolate and barium ricinolate.

* * * * *